United States Patent
Warnshuis et al.

(10) Patent No.: US 10,442,899 B2
(45) Date of Patent: Oct. 15, 2019

(54) STABLE ETHYLSILICATE POLYMERS AND METHOD OF MAKING THE SAME

(71) Applicant: SILBOND CORPORATION, Weston, MI (US)

(72) Inventors: Kenneth Warnshuis, Adrian, MI (US); Tyler Haber, Weston, MI (US); Peter Rau, Morenci, MI (US); Keith Hirsch, Canton, MI (US)

(73) Assignee: Silbond Corporation, Weston, MI (US)

( * ) Notice: Subject to any disclaimer, the term of this patent is extended or adjusted under 35 U.S.C. 154(b) by 0 days.

(21) Appl. No.: 14/941,107

(22) Filed: Nov. 13, 2015

(65) Prior Publication Data

US 2016/0137841 A1    May 19, 2016

Related U.S. Application Data

(60) Provisional application No. 62/080,596, filed on Nov. 17, 2014.

(51) Int. Cl.
| | | |
|---|---|---|
| *A01N 47/12* | (2006.01) | |
| *C08J 3/09* | (2006.01) | |
| *C08K 3/08* | (2006.01) | |
| *C08L 83/02* | (2006.01) | |

(52) U.S. Cl.
CPC .......... *C08J 3/093* (2013.01); *C08K 3/08* (2013.01); *C08L 83/02* (2013.01); *C08K 2003/0893* (2013.01)

(58) Field of Classification Search
None
See application file for complete search history.

(56) References Cited

U.S. PATENT DOCUMENTS

| | | | |
|---|---|---|---|
| 2,296,638 A | 9/1942 | Hanahan | |
| 2,419,017 A | 4/1947 | Grimm | |
| 2,851,752 A | 9/1958 | Benham | |
| 3,004,857 A | 10/1961 | Merson et al. | |
| 3,368,928 A | 2/1968 | Chadha et al. | |
| 3,392,036 A | 7/1968 | McLeod | |
| 3,503,772 A | 3/1970 | Fields | |
| 3,627,807 A | 12/1971 | Bleh et al. | |
| 3,803,197 A | 4/1974 | Anderson et al. | |
| 3,804,639 A | 4/1974 | Trulsson et al. | |
| 3,872,146 A | 3/1975 | Rossmy | |
| 3,912,650 A | 10/1975 | Khalid et al. | |
| 3,948,963 A | 4/1976 | Rossmy | |
| 3,948,964 A * | 4/1976 | Barfurth | C04B 35/6316 556/401 |
| 4,014,703 A | 3/1977 | Hayati et al. | |
| 4,015,996 A | 4/1977 | Wason | |
| 4,042,612 A | 8/1977 | Magee, Jr. | |
| 4,089,690 A | 5/1978 | Pantzer et al. | |
| 4,113,761 A | 9/1978 | Kreuzburg et al. | |
| 4,171,228 A | 10/1979 | Lowrey | |
| 4,172,737 A | 10/1979 | Magee, Jr. | |
| 4,191,562 A | 3/1980 | Magee, Jr. | |
| 4,197,252 A | 4/1980 | Joch et al. | |
| RE30,284 E | 5/1980 | Magee, Jr. | |
| 4,211,717 A | 7/1980 | Das et al. | |
| 4,288,604 A | 9/1981 | Magee et al. | |
| 4,344,800 A | 8/1982 | Lutz | |
| 4,480,072 A | 10/1984 | Mallon | |
| 4,842,837 A | 6/1989 | Shimizu et al. | |
| 4,983,369 A | 1/1991 | Barder et al. | |
| 5,100,581 A | 3/1992 | Watanabe et al. | |
| 5,186,743 A | 2/1993 | Flasch | |
| 5,205,398 A | 4/1993 | Hart et al. | |
| 5,217,533 A | 6/1993 | Hay et al. | |
| 5,352,277 A | 10/1994 | Sasaki | |
| 5,391,673 A | 2/1995 | Ekeland et al. | |
| 5,425,930 A | 6/1995 | Anderson | |
| 5,709,639 A | 1/1998 | Hart et al. | |
| 5,769,689 A | 6/1998 | Cossaboon et al. | |
| 5,783,489 A | 7/1998 | Kaufman et al. | |
| 5,860,848 A | 1/1999 | Loncki et al. | |
| 5,904,159 A | 5/1999 | Kato et al. | |
| 6,334,880 B1 | 1/2002 | Negrych et al. | |
| 6,432,151 B1 | 8/2002 | So et al. | |
| 6,527,818 B2 | 3/2003 | Hattori et al. | |
| 6,855,335 B2 | 2/2005 | Seok et al. | |
| 8,053,479 B2 | 11/2011 | Masuda et al. | |
| 8,829,144 B2 | 9/2014 | Magee et al. | |
| 8,961,677 B2 | 2/2015 | Magee, Jr. et al. | |
| 2004/0266613 A1 | 12/2004 | Addiego et al. | |
| 2006/0093786 A1 | 5/2006 | Ohashi et al. | |
| 2006/0255015 A1 | 11/2006 | Siddiqui | |

(Continued)

FOREIGN PATENT DOCUMENTS

| | | |
|---|---|---|
| CN | 1738711 A | 2/2006 |
| CN | 1930258 A | 3/2007 |

(Continued)

OTHER PUBLICATIONS

MSDS for Ethyl Acetate, Dec. 20, 2017, p. 1-3.*
Stober et al., Controlled Growth of Monodisperse Silica Spheres in the Micron Size Range, Journal of Colloid and Interface Science, pp. 62-69, vol. 26, Jan. 1968.
Iler, R. K., The Chemistry of Silica: Solubility, Polymerization, Colloid and Surface Properties, and Biochemistry, pp. 364-399, John Wiley & Sons, ISBN 0-471-02404-X, 1979.
Van Blaaderen et al., Monodisperse Colloidal Silica Spheres from Tetraalkoxysilcanes: Practice Formation and Growth Mechanism, Journal of Colloid and Interface Science, Dec. 1992, pp. 481-501.
OXSOL Material Safety Data Sheet for OXSOL 100, Mar. 27, 2012, pp. 1-10.

(Continued)

*Primary Examiner* — Robert T Butcher

(57) ABSTRACT

Ethylsilicate polymers and a method of making, specifically ethylsilicate polymer binders with reduced levels of regulated volatile organic compounds (VOCs) for use in the coatings industry and casting industry, and more specifically to stable, fast cure ethylsilicate polymer binders with low levels of regulated VOCs.

46 Claims, No Drawings

(56) References Cited

U.S. PATENT DOCUMENTS

| | | |
|---|---|---|
| 2008/0086951 A1 | 4/2008 | Wakamiya et al. |
| 2009/0306326 A1 | 12/2009 | Magee et al. |
| 2010/0071272 A1 | 3/2010 | Higuchi |
| 2011/0160429 A1 | 6/2011 | Magee et al. |
| 2011/0209413 A1 | 9/2011 | Nishida et al. |
| 2013/0145964 A1 | 6/2013 | Barth et al. |
| 2014/0221567 A1 | 8/2014 | Fazel et al. |
| 2014/0311384 A1* | 10/2014 | Ledford ............... C09D 7/001 106/311 |
| 2014/0312264 A1 | 10/2014 | Warnshuis et al. |

FOREIGN PATENT DOCUMENTS

| | | |
|---|---|---|
| CN | 103666136 A | 3/2014 |
| EP | 1724316 A1 | 11/2006 |
| TW | 250570 B | 3/2006 |
| WO | 2016081402 A2 | 5/2016 |

OTHER PUBLICATIONS

OXSOL 100 Sales Specification, Mar. 2006.
Eide, n-Butyl Acetate, Isobutyl Acetate, sec-Butyl Acetate, tert-Butyl Acetate, Methods Development Team, Industrial Hygiene Chemistry Division, OSHA Salt Lake Technical Center, Sandy, UT 84070-6406, Jan. 2007.
Ethyl Polysilicate 40, SiSiB® Silicones.
Dynasylan® Silbond® HT-28A, Evonik Resource Efficiency GmbH.
European Search Report dated Jun. 8, 2018 corresponding to European Application No. 15861395.0 filed Nov. 17, 2015 (6 pages).

* cited by examiner

STABLE ETHYLSILICATE POLYMERS AND METHOD OF MAKING THE SAME

CROSS REFERENCE TO RELATED APPLICATIONS

This U.S. Patent Application claims the benefit of and priority to U.S. Provisional Patent Application Ser. No. 62/080,596 filed Nov. 17, 2014, the entire disclosure of the application being considered part of the disclosure of this application, and hereby incorporated by reference.

FIELD OF THE INVENTION

The present invention is directed to ethylsilicate polymers, specifically ethylsilicate polymer binders with reduced levels of regulated volatile organic compounds (VOCs), and more specifically to stable, fast cure ethylsilicate polymer binders with low levels of regulated VOCs.

BACKGROUND FOR THE INVENTION

Ethylsilicate polymers and ethylsilicate binders are used in a variety of applications in various industries. Common uses include coatings, sealants, consolidents, and other uses in the investment casting industry. Ethylsilicate binders are typically mixed into other products for use in commercial and industrial applications. For example, in the coatings industry, the ethylsilicate binder may be mixed with other materials to create an inorganic zinc-rich primer for coating metals against corrosion or before application of paint. In the casting industry, ethylsilicate binders are mixed in with other materials to form the casting material into a hardened ceramic material.

Traditional ethylsilicate binders include various VOCs that are released during the application and use of the product and while the product cures. Many of the VOCs included in traditional ethylsilicate binders are regulated by various governmental agencies, such as the Environmental Protection Agency in the United States of America. In most ethylsilicate polymers the majority of regulated VOCs come from the ethanol or other alcohols, and the solvents that are typically used to keep the silica from gelling during manufacture, transportation, storage and use. For example, in the coatings industry, ethylsilicate binders when used in inorganic zinc-rich primers generally include a ketone or an ether as a solvent, such as at least one of methyl n-amyl ketone (MAK), dipropylene glycol monomethyl ether (also known as glycol ether DPM) and ethanol, which are subject to various VOC regulations. There are many other regulated solvents. The ethanol, MAK, and DPM are also common in ethylsilicate polymers in the investment casting industry. These ethylsilicate binders, which include the above identified chemicals and solvents, which are regulated as VOCs, are well known and produce products with long-term stability, easy manufacturing processes, high product performance, consistent product quality, and easy transportation and storage. As these ethylsilicate polymer binders in common use generally use at least one of the above regulated solvents, and include ethanol, when they are used in commercial or industrial applications, the user, whether as a value added manufacturer or an end user, typically must monitor the amount of VOCs included in the product and the release of the regulated VOCs and comply with various restrictions on their application and use. If a user exceeds specified levels, the user must take steps to mitigate which may be costly and require substantial time and effort to ensure compliance with various regulations. As such, any reduction in regulated VOCs, in the end product, even if the ethylsilicate polymer is only a part of the end product, may save the user substantial costs, time and effort.

As many regulations regarding VOCs regulate such VOCs by measuring by what is in the product at the time of shipment, the use of ethylsilicate binders including regulated VOCs, in addition to any ethanol created or added during the manufacturing process, adds complexity and expense for the user, if the regulated VOCs exceed the regulated thresholds. Therefore, many users of ethylsilicate polymers desired reduced regulated VOC products. However, as the industries where ethylsilicate polymers are used are typically highly technical with strict performance requirements, any reduction in performance characteristics with a product having lower regulated VOC levels would be unacceptable.

Some manufacturers have attempted to use water-based solvents that do not include regulated VOCs in place of solvents containing regulated VOCs in ethylsilicate polymers or binders in order to reduce the amount of regulated VOCs. First, changing the solvents alone does not eliminate regulated VOCs, as the product still includes ethanol and other alcohols. However, these known substitute solvents, particularly water based solvents when used in ethylsilicate polymer binders, have substantial performance, longevity and other issues and have not been adapted by industry. More specifically, most ethylsilicate polymer binders have a natural tendency to gel or precipitate out of the solvent, making them generally unstable, particularly during storage, transportation, and subsequent use to create other products. In making ethylsilicate polymers, the manufacturer is constantly making sure the product does not gel or precipitate out of solution, as any minor change in formulation generally causes these negative results. As such, no solvent substitution has had commercial acceptance because the resulting ethylsilicate polymer had substantial reduced performance characteristics. In particular, water-based solvents create ethylsilicate binders that are not stable, both during the manufacturing process as well as during transportation and storage. In addition, as many users combine the ethylsilicate polymer with other materials to form a final product. Ethylsilicate polymers in water-based solvents are typically unstable, as they have been found to react with many other materials causing the silica to gel or precipitate out. Specific problems with ethylsilicate polymers using water-based solvents include a tendency to gel, which makes them unusable for most desired applications. Temperature changes during transportation and storage of the product are also problematic in ethylsilicate binders formed with water-based solvents. Even if the solvent is not water-based, manufacturers have not to date found a solvent with low to no regulated VOCs that may be substituted for the typical MAK or glycol ether DPM solvents that retain substantially similar performance characteristics. Currently, all solvent substitutions for these traditional solvents, whether water-based or not, have not been able to provide the long term stability, consistent quality and consistent performance considerations and furthermore are especially not stable during use, temperature changes, transportation, and subsequent use into a final product. More specifically, it has been found that solvent substitutions, whether water-based or not, tend to cause the ethylsilicate materials to gel which makes them unusable for the desired applications. With some solvents, the ethylsilicate material may even suddenly gel during the manufacturing process creating substantial problems, and most solvent substitutions at a minimum cause the ethylsilicate polymer to partially gel, which is also unacceptable and creates numerous problems, including precipitation of the silica out of the material, all of which makes the product unfit for its intended purpose. These problems may even ruin the equipment used with ethylsilicate polymer under certain conditions.

In view of the above issues, there is a need for an ethylsilicate polymer binder with low or reduced regulated VOCs which is highly stable during the manufacturing process, transportation, storage, and final preparation into an end use product, including contributing to stable storage and use of such end use product, with consistent, repeatable and high performance characteristics during use or application by the ultimate user. Having non-regulated chemicals as solvents or an overall product with reduced regulated VOC levels may allow the end user to avoid otherwise necessary and expensive regulatory compliance steps required by existing ethylsilicate polymer binders. Even if the ethylsilicate binder still includes some regulated VOCs such as ethanol, the reduction in VOCs may allow for reduced regulatory compliance as well as reduction in the time-consuming and expensive steps in complying with certain regulatory requirements as compared with products having regulated VOCs. To date, no ethylsilicate polymer binder having low or reduced amounts of regulated VOCs is available with acceptable or improved performance characteristics.

SUMMARY OF THE INVENTION

The present invention is directed to ethylsilicate polymers, preferable ethylsilicate polymers with low levels of regulated volatile organic compounds (VOCs), more specifically to stable, fast-curing ethylsilicate polymer binders with reduced levels of regulated VOCs. In addition, the present invention provides a long-term stable binder that has reduced VOCs and substantially eliminates or reduces solvents that are regulated for VOCs, while yet having the similar or improved performance characteristics. In addition, surprisingly, the resulting ethylsilicate polymer binder with the new solvents of the present invention even has a faster cure time than prior art ethylsilicate polymer binders that use common solvents having regulated VOCs, such as MAK and glycol ether DPM, and yet has much lower regulated VOCs.

The VOCs for a particular product are calculated as they are shipped and when such product is put into subsequent products, the end product may include other products also containing components subject to VOC regulations. Therefore, any particular input product having lower regulated VOC levels may provide benefits to a manufacturer who uses the materials in producing additional products as well as the ultimate end user of the product. For example, in the coatings industry, ethylsilicate polymer binders are used to create primers. In the investment casting industry, the ethylsilicate polymer binders are used to create a hardened ceramic material. The manufacturer as well as the ultimate end consumer must account for all input products subject to VOC regulations, and ensure that the particular product is under regulatory limits, not subject to such regulations or if subject to such regulations, comply with certain costly and time-consuming regulatory requirements regarding the release of VOCs including various capture and mitigation protocols.

The present invention reduces regulated VOCs in ethylsilicate binders by substituting a propylene carbonate, oxsol, tertiary butyl acetate, or combination thereof, in place of the commonly used solvents, such as dipropylene glycol methyl ether or the methyl amyl ketone solvents that are regulated for VOCs. Because ethylsilicate polymer binders are known to be very unstable, any variation in the manufacturing process or any substation of chemicals typically causes failure of the product or reduced performance characteristics. In view of the above problems, a manufacturer is not able to simply substitute in any solvent that is not regulated into the process in place of MAK or DPM. Instead, the present invention has developed both a novel and unique process for forming the ethylsilicate polymer and substitute chemicals that are not regulated for VOC levels and yet maintains desired performance characteristics. In addition, it has been found that a single substitution of a solvent in place of the MAK or DPM did not function or provide a stable product, and using the same process to make an ethylsilicate polymer product as one made using as MAK or DPM as a solvent unexpectedly did not provide the resulting product with the desired performance characteristics. While traditionally ethylsilicate polymer binders may be formed with only MAK, only DPM, or a combination of thereof to provide a stable product, it has been found that any substitution with exempt solvent caused the product to gel during the manufacturing process or during storage and transportation. As such, the product was never able to be used as desired by various types of users. To avoid gelling during the manufacturing process, and during storage and transportation, as well as use by value added manufactures or the ultimate end user, the inventors have developed new formulations and methods, such as using propylene carbonate, and adding the propylene carbonate as a solvent before hydrolysis. It has also been found that for the best performance characteristic and high stability, as described below, after hydrolysis another solvent such as oxsol or tertiary butyl acetate should be used. The combination of propylene carbonate before hydrolysis and at least one of oxsol or tertiary butyl acetate after hydrolysis, a stable ethylsilicate polymer binder may be formed with high-performance characteristics and surprisingly, as described below, an improved fast-cure ethylsilicate polymer binder, with improved drying times in end use products.

The present invention is generally directed to a polyethylsilicate composition having generally 18-50% by weight $SiO_2$ based on the total composition weight; 0-60% by weight alcohol based on the total composition weight; and a positive amount of solvent, wherein said solvent forms up to 25% by weight, based on the total composition weight, and wherein said solvent comprises at least one of propylene carbonate, tert-butylacetate, or parachlorobenzotrifluoride; and wherein said solvent and said alcohol in combination form 5-70% by weight, based on the total composition. The composition in generally hydrolyzed in an amount of 55-90%, and any alcohol or ethanol produced during hydrolysis may be left in to stabilize the final product, but is expected to at least be partly stripped out to reduce regulated VOCs, as most alcohols, including ethanol are regulated VOCs. It is expected that ethanol will form the majority (greater than 50%) of the alcohol, and more specifically that the alcohol will be substantially ethanol, that is only minor amounts of alcohols are present, as one skilled in the art would recognize that any alcohol formed from chemical reaction generally includes minor amounts of other alcohol.

The solvent and ethanol are expected to be 10-55%, preferably 16-45% and more preferably 35-50% by weight, based on the weight of the total composition, for most binders of the present invention when used with zinc rich primers in the coating industry. In comparison, when the present invention is used in the castings industry, such as a binder used to harden investment casting, the solvent and ethanol are typically 10-70%, preferably 30-68%, and more preferably 40-60% by weight, based on the weight of the total composition. Notwithstanding the foregoing, as some of the ethanol may be stripped out, it is expected that ethanol will typically form less than 60%, preferably less than 45%, and more preferably less than 40% by weight, based on the weight of the total composition. Removal of ethanol or other alcohols reduces the regulated VOCs. While the present invention includes a binder with no or at most trace levels of alcohol (less than 0.5% by weight), it is expected that most formulations will include some ethanol as it is generally helpful in stabilizing the composition, and in the casting industry makes working the product when added to refractories easier, typically 10-40% by weight ethanol, based on the weight of the total composition.

As stated above, most binders used in the coatings and casting industries include at least one of methyl amyl ketone, or dipropylene glycol methyl ether, in addition to high levels of ethanol, such as more than 45%, typically more than 50% and likely more than 55% by weight of a combination of the above items, based on the total weight of the composition, which lead to the up to 80% by weight regulated VOCs, based on the total weight of the composition. In view of the above, most of the binders of the present invention are free from or include trace amounts (less than 0.5% by weight of the total composition) of methyl amyl ketone and dipropylene glycol methyl ether. Notwithstanding the foregoing, some binders may include small amounts of methyl amyl ketone and/or dipropylene glycol methyl ether to obtain certain performance characteristics. As such, the composition of the present invention includes a solvent having less than 10%, preferably less than 5% and more preferably less than 3% by weight of methyl amyl ketone, based on the weight of the total composition, and less than 7.5%, preferably less than 5% and more preferably less than 3% by weight of dipropylene glycol methyl ether, based on the weight of the total composition. In compositions that include at least one of methyl amyl ketone or dipropylene glycol methyl ether, they occur at most individually or in combination in an amount of 1-3% by weight, based upon the weight of the total composition. However, as stated above, most of the compositions claimed are essentially free of said methyl amyl ketone and said dipropylene glycol methyl ether.

The solvent of the composition, while present in a positive amount, may include generally 0-25%, by weight of said propylene carbonate, 0-25% by weight of said tert-butylacetate, or 0-25% by weight of said parachlorobenzotrifluoride, each individually based upon the weight of the total composition. If the solvent includes propylene carbonate, it generally includes 5-15%, preferably 5-10% by weight of said propylene carbonate, based on the weight of the total composition. If the solvent includes tert-butylacetate, it generally includes 5-18%, preferably 8-15% by weight of said tert-butylacetate, based on the weight of the total composition. If the solvent includes parachlorobenzotrifluoride, it generally includes 5-15%, preferably 8-15% by weight of said parachlorobenzotrifluoride, based on the weight of the total composition. Of course, if the solvent includes two or more, each one individually may appear in a smaller amount than the above stated ranges, yet in combination would form at least 3-40%, preferably 4-30%, and more preferably 4-25% and yet more preferably 4.5-24% by weight, based on the weight of the total composition. As illustrated in some of the tables, the solvent in some binders includes both propylene carbonate and said tert-butylacetate, or both propylene carbonate and parachlorobenzotrifluoride. In the event the solvent includes propylene carbonate and tert-butylacetate, the solvent includes 10-25% by weight of the combination of said propylene carbonate and said tert-butylacetate, based on the total weight of the composition. In addition, where the solvent includes 10-25% by weight of the combination of said propylene carbonate and said tert-butylacetate, based on the total weight of the composition, the propylene carbonate forms 10-20% by weight and the tert-butylacetate 5-15% by weight, each based on the weight of the total composition for use in the castings industry, although such binders could be used in the coatings industry. In comparison, for the coatings industry, although the resulting binder could also be used in the castings industry, where the solvent includes 10-25% by weight of the combination of said propylene carbonate and said tert-butylacetate, based on the total weight of the composition, the propylene carbonate forms 3-12% by weight and the tert-butylacetate forms 7-14% by weight, each based on the weight of the total composition. In addition, for certain binders or compositions where the solvent includes both propylene carbonate and tert-butylacetate, the solvent generally includes 5-6% by weight of said propylene carbonate and 13-14% by weight of said tert-butyl-acetate each based on the weight of the total composition. For the binders or compositions including both propylene carbonate and tert-butylacetate, the alcohol generally forms 35-40% by weight, based on the weight of the total composition. The above compositions, including both propylene carbonate and tert-butylacetate, when used as binders in the coatings industry have been found that when used in connection with zinc rich coatings, they provide an improved binder with a much faster cure time, such that surprisingly the resulting coating is capable of passing a MEK 50 rub test in between six and eight hours after application of a zinc rich coating formed of the ethylsilicate as a binder with zinc dust or particles and refractories. For these coatings, the compositions forming the binders generally include alcohol 35-40% by weight, solvents 18-20% by weight, which in turn include 5-6% by weight of said propylene carbonate and 13-14% by weight of said tert-butyl-acetate, each based upon the weight of the total composition. In addition, the ethylsilicate composition is hydrolyzed and the propylene carbonate is added before or during hydrolysis and the tert-butyl-acetate is added after hydrolysis. The source of the $SiO_2$ may be either a colloidal silica sol or a condensed silica solution.

The present invention is also generally directed to a polyethylsilicate composition comprising: 18-80% by weight of $SiO_2$, based on the total weight of the composition, an acid; an alcohol; a propylene carbonate in an amount of up to 30% by weight, based on the weight of the composition and wherein said alcohol and said propylene carbonate in combination form less than 70% by weight, based on the total weight of the composition. The composition is hydrolyzed in an amount of 55-90%, and the propylene carbonate is added before or during hydrolization of the composition. It is believed that the propylene carbonate is helpful in stabilizing the composition during hydrolysis. The composition may further include tert-butylacetate, which is added after hydrolization in an amount of up to 25% by weight, based on the weight of the composition. If the tert-butylacetate is added before hydrolization it is typically consumed. The composition may also include parachlorobenzotrifluoride in an amount of up to 25% by weight, based on the weight of the composition. In some compositions, the composition may including in combination, tert-butylacetate, parachlorobenzotrifluoride and propylene carbonate in an amount of 5-40% by weight, based on the weight of the total composition.

The present invention is also directed to a method of forming a polyethylsilicate composition and wherein said method includes the steps of: adding ethanol, an acid and a silica source to a reactor; heating the reactor after said step of adding; adding an ethylsilicate source to the reactor to initiate a hydrolysis reaction; and adding propylene carbonate to the reactor after the hydrolysis reaction. The method may further including the steps of adding parachlorobenzotrifluoride to the reactor after the hydrolysis reaction. In addition, the method may include a step of stripping ethanol from the reactor. The silica source is expected to be a colloidal silica sol, but also could be a condensed silica solution. In addition, the method may include the steps of adding propylene carbonate before adding, during adding or both before and during adding the ethylsilicate source, The present invention is further directed to a method of forming a polyethylsilicate composition and wherein said method includes the steps of: adding a silica source and a propylene carbonate to a reactor; and adding an ethylsilicate source to the reactor to initiate a hydrolysis reaction. The method may further include the step of adding tert-butylacetate to the reactor after said hydrolysis reaction. In addition, the method may include a step of adding additional propylene carbonate after the hydrolysis reaction. The method may further include the steps of adding a mineral acid to the reactor before the hydrolysis reaction, heating the reactor, including the silica source, propylene carbonate, and acid, adding a solvent after the hydrolysis reaction, such as propylene carbonate, tert-butylacetate, and parachlorobenzotrifluoride.

The present invention may also be directed to a method of forming a polyethylsilicate composition and wherein said method includes the steps of: adding ethanol, an acid and a silica source, and propylene carbonate to a reactor; heating the reactor after said step of adding; and hydrolizing the contents of the reactor. The hydrolysis reaction may be initiated by adding water to the reactor. Of course, the reactor may be heated or cooled as needed during the method, and the silica source may be a polyethylsilicate.

The invention will now be described in connection with the accompanying tables.

DETAILED DESCRIPTION

The present invention is directed to ethylsilicate polymers and a method of manufacturing ethylsilicate polymers, specifically ethylsilicate polymer binders with reduced levels of regulated volatile organic compounds (VOCs), and more specifically to stable, fast cure ethylsilicate polymer binders with low levels of regulated VOCs.

The reduced regulated VOC ethylsilicate polymer of the present invention is generally formed by substituting a propylene carbonate, oxsol, tertiary butyl acetate, or combination thereof in place of the dipropylene glycol methyl ether or the methyl amyl ketone. Both dipropylene glycol methyl ether or the methyl amyl ketone are commonly used as solvents and are regulated VOCs, and as such, any of such solvents remaining after production in the ethylsilicate polymer product contribute to the calculated amount of regulated VOCs in the ethylsilicate product. Any reduction in the level of regulated VOCs is beneficial to the users, such as value added manufacturers or end users. The present invention has been found to form a high performance, reduced regulated VOC ethylsilicate polymer, with the option for a faster cure with propylene carbonate, oxsol, tertiary butyl acetate, or combination thereof in place of the dipropylene glycol methyl ether or the methyl amyl ketone.

Because prehydrolyzed ethyl polysilicate binders are typically unstable, it has been found that any variation in the manufacturing process or substitution of chemicals creates an unstable product. Therefore, even after substantial effort to create products having non-regulated solvents, which are in the present invention propylene carbonate, oxsol, tertiary butyl acetate or combination thereof, it was found that simple substitution in place of the dipropylene glycol methyl ether or the methyl amyl ketone solvents in the same amounts and using the same process caused reduced performance characteristics or making a product that was completely unusable to customers. In addition, while traditional ethylsilicate polymer binders may be formed with only MAK, or only DPM, the present invention instead uses propylene carbonate as a solvent. In addition, it has been determined that for best performance characteristics that the polypropylene carbonate should be added before hydrolysis to stabilize the reaction during the hydrolysis by preventing undesirable gelation. It is believed that the reaction is stabilized by adding propylene carbonate as a solvent before hydrolysis stabilizes the reaction during the hydrolysis and prevents undesirable gelation during hydrolysis. While additional propylene carbonate may be added after hydrolysis, it has also been found that for the best performance characteristic in high stability for ethylsilicate binders used as primers and other materials, as described below, after hydrolysis a solvent such as oxsol or tertiary butyl acetate, or combination thereof be used, which provides additional stabilization of the material. However, it has been found that for ethylsilicate polymers and binders used in investment casting, tertiary butyl acetate does not perform well and oxsol is too expensive and slow to set up, such that any additional solvent added after hydrolysis is a different low VOC solvent or more propylene carbonate. By using the combination of propylene carbonate before hydrolysis and at least one of oxsol or tertiary butyl acetate after hydrolysis, a stable prehydrolyzed ethyl polysilicate binder with high-performance characteristics and as described below, surprisingly improved drying times may be formed.

As described below in Table 1, the prehydrolyzed ethyl polysilicates from broadly 10-80% by weight. However, in the castings field, binders typically have a broad range of 20-80% by weight, and in the field of primers a broad range of 30%-75%. The preferred ranges for castings is 50-70% by weight prehydrolyzed ethyl polysilicates, and in the primers field 25-80% by weight prehydrolyzed ethyl polysilicates. The product VOCs by weight are 45-80% broadly, with castings field using products having product VOCs with 50-75% by weight, and preferred 55-75%, and in the primers field, products having product VOCs with 50-75% by weight, typically 55-70% by weight and 50-60% by weight. The product may include non-exempt or regulated solvents of Methyl Amyl Ketone (MAK); and 0-25%, preferable 5-20% and more preferably 10-15%; Dipropylene Glycol Methyl Ether (DPM) 0-20%, preferable 5-15%, and more preferably 5-10%, all references by weight percent of the total product. In addition, the above list of MAK, DPM and the like are examples and are not all of the regulated solvents currently used in making ethylsilicate polymers. As all of these are chemicals that are regulated for release of VOCs, the increase in regulated VOCs may be clearly seen. While some binder have been used in the industry with 10-20% by weight VOCs, these binders are very high in $SiO_2$ content and are very expensive. In addition, the VOCs are regulated VOCs, and these existing low VOC binders have very limited uses with the $SiO_2$ content. For example, these low VOC binders are not able to be used with refractories, because there is not enough viscosity and therefore does not do well in the castings field or primers field, and they do not have a long shelf life and are hard to blend without gelling, as it is so highly hydrolyzed given the high $SiO_2$ content. To summarize, they are unstable, gel and are not able to be used in the field, and their primary use is to be a base binder that is diluted with ethanol or other alcohols or regulated solvents before being shipped to the customer for use. Therefore, while these binders exist, they are not useable in the industry as is, and when shipped have a VOC content after dilution that is typically greater 45% by weight.

TABLE 1

|  | Ranges | | |
| --- | --- | --- | --- |
|  | Broad % | Narrow % | Preferred % |
| Prehydrolyzed ethyl polysilicates Wt. % | 20-80 | 25-45 | 30-42 |
| Product VOC Wt % (Total Non-Exempt Solvents Wt % including ethanol and other alcohols) | 45-80 | 50-75 | 55-75 |
| Specific Gravity | .900-1.200 | .940-1.150 | .990-1.100 |
| $SiO_2$ Wt. % | 18-50 | 20-40 | 25-35 |
| Acidity Wt. % | .01-.50 | .15-.35 | .20-.30 |
| % Hydrolyzed | 55-90 | 60-85 | 65-80 |

As described below in Table 2, the resulting prehydrolyzed ethylsilicate product may include by weight percent of the resulting product 20-50%, preferably 25-45% and more preferable 30-42%; ethanol and other alcohols at the time of shipment of 0-60%, preferable 25-50% and more preferably 30-40% by weight of the total product at the time of shipment (for the castings industry 10-60% (due to the high ethanol content or other solvent required when working with refractories), preferably 25-50% and more preferably 30-40% by weight of the product at time of shipment) (for the primers/coatings industry 0-40%, preferably 10-30%, and 15-20% by weight of the product at time of shipment); exempt or non-regulated solvents (VOCs not regulated) which may include Propylene Carbonate (PC) 0-30%, 0-25% typical, preferable 5-15% and more preferably 5-10% by weight of the product at time of shipment; Tert-Butyl Acetate (TBA) 0-30%, 0-25% typical, preferable 5-15% and more preferably 8-15%; Parachlorobenzotriflouride (PCBTF)—also known as Oxsol 100) 0-30%, 0-25% typical, preferable 5-15, and more preferably 8-15%; or at least one of the above, or a combination of at least two of the above, forming a total of exempt or non-regulated solvents of 5-40%, preferable 10-25% and more preferably 16-23% by weight at the time of shipment. In addition, the product at the time of shipment will include 18-50%, preferable 20-40%, and more preferable 25-35% of silica ($SiO_2$) by weight. Other components of the prehydrolyzed ethyl polysilicate product, as prepared, generally include a mineral or organic acid, and in some binders colloidal silica occurring in 0-20%, preferable 5-15%, and more preferably 7-11% by weight at the time of shipment.

It is expected that a reduction of at least 5-10%, preferably 10-25% and more preferable 20-45% of regulated VOCs will occur in the final prehydrolyzed ethyl polysilicate product of the present invention. In addition, the prevent invention is capable of reducing the regulated or non-exempt VOCs to 0% by weight of the overall product at the time of shipment. However, in the castings industry, the regulated or non-exempt VOCs is expected to have a minimum of 15%, more likely 20% by weight of the final product at the time of shipment, due to casting binders having a higher amount of VOCs in the prior art products, and in addition, some of the non-exempt solvents are not able to be used in the castings industry. For example, TAB is not able to be used in castings industry as it does not have the desired performance characteristics. In addition, the coatings or primers industry has traditionally had lower regulated amounts of allowed VOCs than the castings industry, so the binders used in the castings industry were already improved with lower VOC levels, however due to regulations from governmental industries, it is expected that a greater reduction is required in VOC levels in the future. The present invention may in certain circumstances use regulated or non-exempt solvents, such as MAK, DPM or the like 0-10%, preferably 0-5% and more preferably 0-3% by weight of the product at the time of shipment, to meet certain performance characteristics. However, these binders typically previously had 50% or more of these regulated solvents, and as such, the amount has been reduced by typically a factor of 10 or more, which is a huge reduction in such regulated VOCs.

TABLE 2

|  | Ranges | | |
| --- | --- | --- | --- |
|  | Broad % | Narrow % | Preferred % |
| Prehydrolyzed ethyl polysilicates Wt. % | 20-60 | 25-45 | 30-42 |
| Product VOC Wt % | 20-55 | 30-50 | 32-40 |
| Specific Gravity | .900-1.200 | .940-1.150 | .990-1.100 |
| $SiO_2$ Wt. % | 18-50 | 20-40 | 25-35 |
| Acidity Wt. % | .01-.50 | .15-.35 | .20-.30 |
| % Hydrolyzed | 55-90 | 60-85 | 65-80 |
| Total Non-Exempt Solvents Wt. % (including ethanol and other alcohols) | 0-60 | 0-50 | 0-40 |
| Ethanol and other alcohols Wt % | 0-60 | 0-50 | 0-40 |
| Total Exempt Solvents Wt. % | 5-40 | 10-25 | 16-23 |
| Reduced VOC Prehydrolyzed ethyl polysilicate Products |  |  |  |
| Propylene Carbonate (PC) | 0-30 | 5-15 | 5-10 |
| Tert-Butyl Acetate (TBA) | 0-30 | 5-15 | 8-15 |
| Parachlorobenzotrifluoride (PCBTF) (Oxsol 100) | 0-30 | 5-15 | 8-15 |

A list of examples follows in various tables. These examples have been found to have acceptable performance characteristics, and as identified below, some of the examples were found not to be acceptable. In addition, 2-amino 2-methyl 1-proponal may also be used as a solvent, by itself, or in combination with the other identified solvents. It can be put in before, during or after hydrolysis. Of course, the desired performance characteristics may vary depending on the desired application. For example, the LV4 and LV5 formulations in Tables 18 and 19 are very desirable for use in the casting industry. In comparison, the LV1-LV3 formulations in Tables 3-6 as examples 1-10 and LV3.1 in Tables 18 and 19 are very useful as binders for zinc oxide primers in the coatings industry. The specific example number is provided in the left column of the relevant tables, and specific examples may occur in multiple tables. Table 3 provides exemplary input weights, and Table 4 provides the same information by weight percent. The examples 11 and 21 in the tables is labeled as "standard" because it is a typical industry ethylsilicate polymer binder used with primers. The tables also include references to Silbond HT-28A, Silbond HT-33, Silbond HT-21.5PM, Silbond HT-25, and Silbond HT-30, with information regarding the silicon dioxide levels and product VOC levels, for comparison, as these are existing binders that use DPM, MAK or a combination thereof, and in the event that DPM or MAK is not used, such as in HT-21.5PM, H-25, and HT-30, very high levels of ethanol are used, such as five to eleven times as much ethanol as compared to the HT-28A and HT-33 binders that use DPM and MAK. It should be noted that binders do exist that do not include MAK and DPM, however such binders have very high levels of ethanol, which is a regulated VOC, and as such are not reduced, low level or exempt VOCs binders. Therefore, the invention is not simply directed to the removal of DPM and MAK, but also a binder that uses low levels of ethanol in addition to not use (or using minor amounts) of DPM and MAK.

In Tables 3 and 4, the amount hydrolyzed, the percentage of VOC (by weight percent) and the amount of $SiO_2$ by weight percent as well as the atmospheric-aged shelf life stability of the product are shown. The same examples are then carried forward into Tables 5 and 6, which provide the final product formulations for the examples that go through the process. It should be noted that Examples 1-5 include no MAK or DPM, while Example 6 includes reduced amounts of MAK and no DPM, which as stated above is regulated for release of VOCs. Examples 7-10 include DPM, which as stated above is regulated for release of VOCs, but no MAK. Example 10 has reduced amounts of DPM and no MAK. Example 11 is an exemplary standard prior art batch input, including full amounts of MAK and DPM. As seen in Tables 3-6, Example 11 includes by weight 50.5% chemicals that are regulated for VOC levels, however the amount of regulated VOC levels may fall as low as 35% in the Examples in Tables 3-6. In the later tables with the LV4 and LV5 formulations or variations thereof, the ethanol amounts in the product may be minimized also creating low VOC binders.

In Tables 3-6, the column headers mean the following: Colloidal Sol means 50% sodium silicate dispersion; Sulfuric Acid means 93% technical grade sulfuric acid; DPM means dipropylene glycol methyl ether (non-exempt solvent); MAK means methyl amyl ketone (non-exempt solvent); PC means propylene carbonate (exempt solvent); PCBTF means parachlorobenzotrifluoride (exempt solvent); TBA means tert-butylacetate (exempt solvent); Hydrolysis means a process used to react ethylsilicates with water; $SiO_2$ means theoretical silica dioxide content as a percent by weight. As seen in Tables 5 and 6, the final product for all examples included about 31-34% by weight of $SiO_2$ and was 65.4% hydrolyzed.

TABLE 3

Low VOC LV-3 Batch Formulations by Weight Composition

| Binder | Ethyl Silicates Blend (wt. %) | Colloidal Sol (wt. %) | Sulfuric Acid (wt. %) | Dipropylene Glycol Methyl Ether (DPM) (wt. %) | Methyl Amyl Ketone (MAK) (wt. %) | Propylene Carbonate (PC) (wt. %) |
|---|---|---|---|---|---|---|
| 1 LV-3 PC-PC | 2728.5 | 537.6 | 10.6 | | | 569.0 |
| 2 LV-3 PC-OX | 2728.5 | 537.6 | 10.6 | | | 179.8 |
| 3 LV-3 PC-TBA | 2728.5 | 537.6 | 10.6 | | | 179.8 |
| 4 LV-3 tBA-double PC | 2728.5 | 537.6 | 10.6 | | | 359.6 |
| 5 LV-3 PC-TBA mod. molar | 2728.5 | 537.6 | 10.6 | | | 123.8 |
| 6 LV-3 PC-TBA-MAK | 2728.5 | 537.6 | 10.6 | | 97.3 | 179.8 |
| 7 LV-3 DPM-TBA | 2728.5 | 537.6 | 10.6 | 179.8 | | |
| 8 LV-3 DPM-OX | 2728.5 | 537.6 | 10.6 | 179.8 | | |
| 9 LV-3 DPM-PC | 2728.5 | 537.6 | 10.6 | 179.8 | | 389.2 |
| 10 LV-3 PC-TBA-DPM | 2728.5 | 537.6 | 10.6 | 79.8 | | 279.8 |
| 11 3 Standard | 2728.5 | 537.6 | 10.6 | 179.8 | 389.8 | |

| | Parachloro-benzotrifluoride (PCBTF) Oxsol 100 (wt. %) | tert Butyl Acetate (TBA) (wt. %) | Hydrolysis % | $SiO_2$ (wt. %) | Product VOC (wt. %) | Atmospheric Stability (months) |
|---|---|---|---|---|---|---|
| 1 | | | 65.4 | 33.56 | 35.8 | 3.0 |
| 2 | 389.2 | | 65.4 | 33.56 | 35.8 | 3.0 |
| 3 | | 389.2 | 65.4 | 33.56 | 35.8 | 3.0 |
| 4 | | 389.2 | 65.4 | 32.06 | 34.2 | 4.5 |
| 5 | | 396.0 | 65.4 | 34.43 | 36.7 | 2.5 |
| 6 | | 291.9 | 65.4 | 33.56 | 38.3 | 4.5 |
| 7 | | 389.2 | 65.4 | 33.56 | 40.4 | 11.5 |
| 8 | 389.2 | | 65.4 | 33.56 | 40.4 | 7.0 |
| 9 | | | 65.4 | 33.56 | 40.4 | 4.5 |
| 10 | | 389.2 | 65.4 | 31.83 | 35.9 | na |
| 11 | | | 65.4 | 33.56 | 50.5 | 6.0+ |

TABLE 4

Low VOC LV-3 Batch Formulations Percent Composition

| | Binder | Ethyl Silicates Blend (wt. %) | Colloidal Sol (wt. %) | Sulfuric Acid (wt. %) | Dipropylene Glycol Methyl ether (DPM) (wt. %) | Methyl Amyl Ketone (MAK) (wt. %) | Propylene Carbonate (PC) (wt. %) |
|---|---|---|---|---|---|---|---|
| 1 | LV-3 PC-PC | 70.96 | 13.98 | 0.28 | | | 14.80 |
| 2 | LV-3 PC-OX | 70.96 | 13.98 | 0.28 | | | 4.68 |
| 3 | LV-3 PC-TBA | 70.96 | 13.98 | 0.28 | | | 4.68 |
| 4 | LV-3 tBA-double PC | 67.78 | 13.35 | 0.26 | | | 8.93 |
| 5 | LV-3 PC-TBA mod. molar | 72.78 | 14.34 | 0.28 | | | 4.80 |
| 6 | LV-3 PC-TBA-MAK | 70.96 | 13.98 | 0.28 | | 2.53 | 4.68 |
| 7 | LV-3 DPM-TBA | 70.96 | 13.98 | 0.28 | 4.68 | | |
| 8 | LV-3 DPM-OX | 70.96 | 13.98 | 0.28 | 4.68 | | |
| 9 | LV-3 DPM-PC | 70.96 | 13.98 | 0.28 | 4.68 | | 10.12 |
| 10 | LV-3 PC-TBA-DPM | 67.28 | 13.26 | 0.26 | 1.97 | | 7.63 |
| 11 | 3 Standard | 70.96 | 13.98 | 0.28 | 4.68 | 10.12 | |

| | Parachlorobenzotrifluoride (PCBTF) Oxsol 100 (wt. %) | Tertiary Butyl Acetate (TBA) (wt. %) | Hydrolysis % | $SiO_2$ Wt. (wt. %) | Product VOC (wt. %) | Atmospheric Stability (months) |
|---|---|---|---|---|---|---|
| 1 | | | 65.4 | 33.56 | 35.8 | 3.0 |
| 2 | 10.12 | | 65.4 | 33.56 | 35.8 | 3.0 |
| 3 | | 10.12 | 65.4 | 33.56 | 35.8 | 3.0 |
| 4 | | 9.67 | 65.4 | 32.06 | 34.2 | 4.5 |
| 5 | | 7.79 | 65.4 | 34.43 | 36.7 | 2.5 |
| 6 | | 7.59 | 65.4 | 33.56 | 38.3 | 4.5 |
| 7 | | 10.12 | 65.4 | 33.56 | 40.4 | 11.5 |
| 8 | 10.12 | | 65.4 | 33.56 | 40.4 | 7.0 |
| 9 | | | 65.4 | 33.56 | 40.4 | 4.5 |
| 10 | | 9.60 | 65.4 | 31.83 | 35.9 | na |
| 11 | | | 65.4 | 33.56 | 50.5 | 6.0+ |

TABLE 5

Low VOC LV-3 Final Product Formulations by Weight Composition

| | Binder | Polysilicates (g) | Colloidal Silica (g) | Sulfuric Acid (g) | Ethanol (EtOH) (g) | Dipropylene Glycol Methyl Ether (DPM) (g) | Methyl Amyl Ketone (MAK) (g) | Propylene Carbonate (PC) (g) | Parachlorobenzotrifluoride (PCBTF) Oxsol 100 (g) | Tertiary Butyl Acetate (TBA) (g) | Hydrolysis % | $SiO_2$ (wt. %) | Product VOC (wt. %) | Atmospheric Stability (months) |
|---|---|---|---|---|---|---|---|---|---|---|---|---|---|---|
| 1 | LV-3 PC-PC | 1622.6 | 268.8 | 10.6 | 1374.7 | | | 569.0 | | | 65.4 | 33.56 | 35.7 | 3.0 |
| 2 | LV-3 PC-OX | 1622.6 | 268.8 | 10.6 | 1374.7 | | | 179.8 | 389.2 | | 65.4 | 33.56 | 35.7 | 3.0 |
| 3 | LV-3 PC-TBA | 1622.6 | 268.8 | 10.6 | 1374.7 | | | 179.8 | | 389.2 | 65.4 | 33.56 | 35.7 | 3.0 |
| 4 | LV-3 tBA-double PC | 1622.6 | 268.8 | 10.6 | 1374.7 | | | 359.6 | | 389.2 | 65.4 | 32.06 | 34.2 | 4.5 |
| 5 | LV-3 PC-TBA mod. molar | 1622.6 | 268.8 | 10.6 | 1374.7 | | | 123.8 | | 396.0 | 65.4 | 34.00 | 36.2 | 2.5 |
| 6 | LV-3 PC-TBA-MAK | 1622.6 | 268.8 | 10.6 | 1374.7 | | 97.3 | 179.8 | | 291.9 | 65.4 | 33.56 | 38.3 | 4.5 |
| 7 | LV-3 DPM-TBA | 1622.6 | 268.8 | 10.6 | 1374.7 | 179.8 | | | | 389.2 | 65.4 | 33.56 | 40.4 | 11.5 |
| 8 | LV-3 DPM-OX | 1622.6 | 268.8 | 10.6 | 1374.7 | 179.8 | | | 389.2 | | 65.4 | 33.56 | 40.4 | 7.0 |
| 9 | LV-3 DPM-PC | 1622.6 | 268.8 | 10.6 | 1374.7 | 179.8 | | 389.2 | | | 65.4 | 33.56 | 40.4 | 4.5 |
| 10 | LV-3 PC-TBA-DPM | 1622.6 | 268.8 | 10.6 | 1374.7 | 79.8 | | 309.4 | | 389.2 | 65.4 | 31.83 | 35.9 | na |
| 11 | 3 Standard | 1622.6 | 268.8 | 10.6 | 1374.7 | 179.8 | 389.2 | | | | 65.4 | 33.56 | 50.5 | 6.0+ |

TABLE 6

Low VOC LV-3 Final Product Formulations Percent Composition

| | Binder | Poly-silicates (wt. %) | Col-loidal Silica (wt. %) | Sulfuric Acid (wt. %) | Ethanol (EtOH) (wt. %) | Dipropylene Glycol Methyl Ether (DPM) (wt. %) | Methyl Amyl Ketone (MAK) (wt. %) | Propylene Carbonate (PC) (wt. %) | Parachlorobenzotrifluoride (PCBTF) Oxsol 100 (wt. %) | Tertiary Butyl Acetate (TBA) (wt. %) | Hydrolysis % | SiO$_2$ Wt. (wt. %) | Product VOC (wt. %) | Atmospheric Stability (months) |
|---|---|---|---|---|---|---|---|---|---|---|---|---|---|---|
| 1 | LV-3 PC-PC | 42.19 | 6.99 | 0.28 | 35.75 | | | 14.79 | | | 65.4 | 33.56 | 35.7 | 3.0 |
| 2 | LV-3 PC-OX | 42.19 | 6.99 | 0.28 | 35.75 | | | 4.68 | 10.12 | | 65.4 | 33.56 | 35.7 | 3.0 |
| 3 | LV-3 PC-TBA | 42.19 | 6.99 | 0.28 | 35.75 | | | 4.68 | | 10.12 | 65.4 | 33.56 | 35.7 | 3.0 |
| 4 | LV-3 tBA-double PC | 40.31 | 6.68 | 0.26 | 34.15 | | | 8.93 | | 9.67 | 65.4 | 32.06 | 34.2 | 4.5 |
| 5 | LV-3 PC-TBA mod. molar | 42.47 | 7.08 | 0.28 | 36.21 | | | 3.26 | | 10.43 | 65.4 | 34.00 | 36.2 | 2.5 |
| 6 | LV-3 PC-TBA-MAK | 42.19 | 6.99 | 0.28 | 35.75 | | 2.53 | 4.68 | | 7.59 | 65.4 | 33.56 | 38.3 | 4.5 |
| 7 | LV-3 DPM-TBA | 42.19 | 6.99 | 0.28 | 35.75 | 4.68 | | | | 10.12 | 65.4 | 33.56 | 40.4 | 11.5 |
| 8 | LV-3 DPM-OX | 42.19 | 6.99 | 0.28 | 35.75 | 4.68 | | | 10.12 | | 65.4 | 33.56 | 40.4 | 7.0 |
| 9 | LV-3 DPM-PC | 42.19 | 6.99 | 0.28 | 35.75 | 4.68 | | 10.12 | | | 65.4 | 33.56 | 40.4 | 4.5 |
| 10 | LV-3 PC-TBA-DPM | 40.02 | 6.63 | 0.26 | 33.90 | 1.97 | | 7.63 | | 9.60 | 65.4 | 31.83 | 35.9 | na |
| 11 | 3 Standard | 42.19 | 6.99 | 0.28 | 35.75 | 4.68 | 10.12 | | | | 65.4 | 33.56 | 50.5 | 6.0+ |

As an example of a different amount of hydrolysis and SiO$_2$, Tables 7-10 are included below. As may be seen from the Tables, the solvents used correlate, such that Example 1 is similar to Example 12, and so on. For ease of reference a prior art Example 21 is included having both DPM and MAK. As may be seen in Tables 7-10, an additional step of stripping off the ethanol and other alcohols occurs, which does not occur with the Examples 1-10 in Tables 3-6. Any inclusion of "na" in the table means that the data is not available, such as a study of the atmospheric stability was not completed or is in process, and should not be taken as meaning not acceptable.

TABLE 7

Low VOC LV-2 Batch Formulations by Weight Composition

| | Binder | Ethyl Silicates (g) | Colloidal Sol (g) | Sulfuric Acid (g) | Ethanol (EtOH) (g) | Dipropylene Glycol Methyl Ether (DPM) (g) | Methyl Amyl Ketone (MAK) (g) | Propylene Carbonate (PC) (g) | Parachlorobenzotrifluoride (PCBTF) Oxsol 100 (g) | tert Butyl Acetate (TBA) (g) | Hydrolysis % | SiO$_2$ (wt. %) | EtOH Strip (g) | Product VOC (wt. %) | Stable Atmospheric (months) |
|---|---|---|---|---|---|---|---|---|---|---|---|---|---|---|---|
| 12 | LV-2 2 × TBA | 2093 | 584.6 | 7.8 | 800 | | | | | 515.0 | 80.7 | 32.97 | 1282 | 37.3 | 2.5 |
| 13 | LV-2 2 × OX | 2093 | 584.6 | 7.8 | 800 | | | | 515.0 | | 80.7 | 32.97 | 1282 | 37.3 | 4.5 |
| 14 | LV-2 2 × PC | 2093 | 584.6 | 7.8 | 800 | | | 515.0 | | | 80.7 | 32.97 | 1282 | 37.3 | 2.5 |
| 15 | LV-2 PC-TBA | 2093 | 584.6 | 7.8 | 800 | | | 154.3 | | 360.7 | 80.7 | 32.97 | 1282 | 37.3 | 4.0 |
| 16 | LV-2 PC-OX | 2093 | 584.6 | 7.8 | 800 | | | 154.3 | 360.7 | | 80.7 | 31.20 | 1282 | 35.3 | 4.0 |
| 17 | LV-2 2 × PC-TBA | 2093 | 584.6 | 7.8 | 800 | | | 308.6 | | 360.7 | 80.7 | 31.20 | 1282 | 35.3 | 4.0 |
| 18 | LV-2 PC-MAK | 2093 | 584.6 | 7.8 | 800 | 389.2 | | 154.3 | | | 80.7 | 31.80 | 1282 | 51.0 | 9.0+ |
| 19 | LV-2 2 × PC-TBA-MAK | 2093 | 584.6 | 7.8 | 800 | | 100.0 | 308.6 | | 260.7 | 80.7 | 31.20 | 1282 | 38.7 | na |
| 20 | LV-2 2 × PC-TBA-DPM | 2093 | 584.6 | 7.8 | 800 | 125.0 | | 308.6 | | 360.7 | 80.7 | 29.89 | 1282 | 38.0 | na |
| 21 | 2 Standard | 2093 | 584.6 | 7.8 | 800 | 154.3 | 360.7 | | | | 80.7 | 32.97 | 1282 | 56.2 | 6.0+ |

TABLE 8

Low VOC LV-2 Batch Formulations Percent Composition

| | Binder | Ethyl Silicates (wt. %) | Colloidal Sol (wt. %) | Sulfuric Acid (wt. %) | Ethanol (EtOH) (wt. %) | Dipropylene Glycol Methyl Ether (DPM) (wt. %) | Methyl Amyl Ketone (MAK) (wt. %) | Propylene Carbonate (PC) (wt. %) | Parachlorobenzotrifluoride (PCBTF) Oxsol 100 (wt. %) | Tertiary Butyl Acetate (TBA) (wt. %) | Hydrolysis % | SiO$_2$ (wt. %) | EtOH Strip (g) | Product VOC (wt. %) | Stable Atmospheric (months) |
|---|---|---|---|---|---|---|---|---|---|---|---|---|---|---|---|
| 12 | LV-2 2 × TBA | 52.32 | 14.61 | 0.19 | 20.00 | | | | | 12.87 | 80.7 | 32.97 | 1282 | 37.3 | 2.5 |
| 13 | LV-2 2 × OX | 52.32 | 14.61 | 0.19 | 20.00 | | | | 12.87 | | 80.7 | 32.97 | 1282 | 37.3 | 4.5 |
| 14 | LV-2 2 × PC | 52.32 | 14.61 | 0.19 | 20.00 | | | 12.87 | | | 80.7 | 32.97 | 1282 | 37.3 | 2.5 |
| 15 | LV-2 PC-TBA | 52.32 | 14.61 | 0.19 | 20.00 | | | 3.86 | | 9.02 | 80.7 | 32.97 | 1282 | 37.3 | 4.0 |
| 16 | LV-2 PC-OX | 52.32 | 14.61 | 0.19 | 20.00 | | | 3.86 | 9.02 | | 80.7 | 32.97 | 1282 | 37.3 | 4.0 |
| 17 | LV-2 2 × PC-TBA | 50.38 | 14.07 | 0.19 | 19.26 | | | 7.43 | | 8.68 | 80.7 | 31.20 | 1282 | 35.3 | 4.0 |
| 18 | LV-2 PC-MAK | 51.95 | 14.51 | 0.19 | 19.86 | | 9.66 | 3.83 | | | 80.7 | 32.63 | 1282 | 51.0 | 9.0+ |
| 19 | LV-2 2 × PC-TBA-MAK | 50.38 | 14.07 | 0.19 | 19.26 | | 2.41 | 7.43 | | 6.27 | 80.7 | 31.20 | 1282 | 38.7 | na |
| 20 | LV-2 2 × PC-TBA-DPM | 48.91 | 13.66 | 0.18 | 18.69 | 2.92 | | 7.21 | | 8.43 | 80.7 | 29.89 | 1282 | 38.0 | na |
| 21 | 2 Standard | 52.32 | 14.61 | 0.19 | 20.00 | 3.86 | 9.02 | | | | 80.7 | 32.97 | 1282 | 56.2 | 6.0+ |

TABLE 9

Low VOC LV-2 Final Formulations by Weight Composition

| | Binder | Polysilicates (g) | Colloidal Silica (g) | Sulfuric Acid (g) | Ethanol (EtOH) (g) | Dipropylene Glycol Methyl Ether (DPM) (g) | Methyl Amyl Ketone (MAK) (g) | Propylene Carbonate (PC) (g) | Parachlorobenzotrifluoride (PCBTF) Oxsol 100 (g) | tert Butyl Acetate (TBA) (g) | Hydrolysis % | SiO$_2$ (wt. %) | Product VOC (wt. %) | Stable Atmospheric (months) |
|---|---|---|---|---|---|---|---|---|---|---|---|---|---|---|
| 12 | LV-2 2 × TBA | 890.4 | 292.3 | 7.8 | 1012.9 | | | | | 515.0 | 80.7 | 32.97 | 37.3 | 2.5 |
| 13 | LV-2 2 × OX | 890.4 | 292.3 | 7.8 | 1012.9 | | | | 515.0 | | 80.7 | 32.97 | 37.3 | 4.5 |
| 14 | LV-2 2 × PC | 890.4 | 292.3 | 7.8 | 1012.9 | | | 515.0 | | | 80.7 | 32.97 | 37.3 | 2.5 |
| 15 | LV-2 PC-TBA | 890.4 | 292.3 | 7.8 | 1012.9 | | | 154.3 | | 360.7 | 80.7 | 32.97 | 37.3 | 4.0 |
| 16 | LV-2 PC-OX | 890.4 | 292.3 | 7.8 | 1012.9 | | | 154.3 | 360.7 | | 80.7 | 31.20 | 35.3 | 4.0 |
| 17 | LV-2 2 × PC-TBA | 890.4 | 292.3 | 7.8 | 1012.9 | | | 308.6 | | 360.7 | 80.7 | 31.20 | 35.3 | 4.0 |
| 18 | LV-2 PC-MAK | 890.4 | 292.3 | 7.8 | 1012.9 | | 389.2 | 154.3 | | | 80.7 | 32.62 | 51.0 | 9.0+ |
| 19 | LV-2 2 × PC-TBA-MAK | 890.4 | 292.3 | 7.8 | 1012.9 | | 100.0 | 308.6 | | 260.7 | 80.7 | 31.20 | 38.7 | na |
| 20 | LV-2 2 × PC-TBA-DPM | 890.4 | 292.3 | 7.8 | 1012.9 | 125.0 | | 308.6 | | 360.7 | 80.7 | 29.89 | 38.0 | na |
| 21 | 2 Standard | 890.4 | 292.3 | 7.8 | 1012.9 | 154.3 | 360.7 | | | | 80.7 | 32.97 | 56.2 | 6.0+ |

TABLE 10

Low VOC LV-2 Final Product Formulations Percent Composition

| | Binder | Polysilicates (wt. %) | Colloidal Silica (wt. %) | Sulfuric Acid (wt. %) | Ethanol (EtOH) (wt. %) | Dipropylene Glycol Methyl Ether (DPM) (wt. %) | Methyl Amyl Ketone (MAK) (wt. %) | Propylene Carbonate (PC) (wt. %) | Parachlorobenzotrifluoride (PCBTF) Oxsol 100 (wt. %) | tert Butyl Acetate (TBA) (wt. %) | Hydrolysis % | SiO$_2$ (wt. %) | Product VOC (wt. %) | Stable Atmospheric (months) |
|---|---|---|---|---|---|---|---|---|---|---|---|---|---|---|
| 12 | LV-2 2 × TBA | 32.75 | 10.75 | 0.29 | 37.26 | | | | | 18.94 | 80.7 | 32.97 | 37.3 | 2.5 |
| 13 | LV-2 2 × OX | 32.75 | 10.75 | 0.29 | 37.26 | | | | 18.94 | | 80.7 | 32.97 | 37.3 | 4.5 |
| 14 | LV-2 2 × PC | 32.75 | 10.75 | 0.29 | 37.26 | | | 18.94 | | | 80.7 | 32.97 | 37.3 | 2.5 |
| 15 | LV-2 PC-TBA | 32.75 | 10.75 | 0.29 | 37.26 | | | 5.68 | | 13.27 | 80.7 | 32.97 | 37.3 | 4.0 |

TABLE 10-continued

Low VOC LV-2 Final Product Formulations Percent Composition

| | Binder | Poly-silicates (wt. %) | Colloidal Silica (wt. %) | Sulfuric Acid (wt. %) | Ethanol (EtOH) (wt. %) | Dipropylene Glycol Methyl Ether (DPM) (wt. %) | Methyl Amyl Ketone (MAK) (wt. %) | Propylene Carbonate (PC) (wt. %) | Parachlorobenzotrifluoride (PCBTF) Oxsol 100 (wt. %) | tert Butyl Acetate (TBA) (wt. %) | Hydrolysis % | SiO$_2$ (wt. %) | Product VOC (wt. %) | Stable Atmospheric (months) |
|---|---|---|---|---|---|---|---|---|---|---|---|---|---|---|
| 16 | LV-2 PC-OX | 32.75 | 10.75 | 0.29 | 37.26 | | | 5.68 | 13.27 | | 80.7 | 32.97 | 37.3 | 4.0 |
| 17 | LV-2 2 × PC-TBA | 31.00 | 10.18 | 0.27 | 35.26 | | | 10.74 | | 12.56 | 80.7 | 31.20 | 35.3 | 4.0 |
| 18 | LV-2 PC-MAK | 32.41 | 10.64 | 0.28 | 36.87 | | 14.17 | 5.62 | | | 80.7 | 32.62 | 51.0 | 9.0+ |
| 19 | LV-2 2 × PC-TBA-MAK | 31.00 | 10.18 | 0.27 | 35.26 | | 3.48 | 10.74 | | 9.08 | 80.7 | 31.20 | 38.7 | na |
| 20 | LV-2 2 × PC-TBA-DPM | 29.70 | 9.75 | 0.26 | 33.79 | 4.17 | | 10.29 | | 12.03 | 80.7 | 29.89 | 38.0 | na |
| 21 | 2 Standard | 32.75 | 10.75 | 0.29 | 37.26 | 5.68 | 13.27 | | | | 80.7 | 32.97 | 56.2 | 6.0+ |

As stated above, the ethylsilicate polymer may be a binder used in inorganic zinc rich primers. For an exemplary product using the binder of the present invention, lower regulated VOC levels are achievable, while maintaining desired performance characteristics. As provided below, normal cure primers, which typically means a cure time in excess of twelve hours and more likely closer to twenty-four hours, have various test data regarding the performance characteristics in Table 11 below. Examples 12-17 have been included from Tables 7-10, as well as the control sample of a standard binder not using the present invention, which was Example 21. In addition, new Examples 22-25 are included where Example 22 is similar to Example 13, but the PCBTF (refers to the OX in the chart) is a single, not double amount, Example 23 is similar to Example 14, but includes half of the PC, Example 24 is similar to Example 12, but includes half of the TBA of Example 12, and Example 25 is different form the other examples, as it uses a combination of PCBTF and TBA as replacement solvents. Example 25 has a specific makeup due to the fact no exempt solvent is added to the reaction after hydrolysis and before stripping, the PCBTF and TBA are added after the ethanol strip. As seen in Table 11, Example 21 is the control sample of one exemplary prior binder, as discussed above, and with the exception of the binder in Example 22 (at the top of Table 11), the performance characteristics are similar to the control samples of Example 21 after 48 hours of cure time. The rub test is generally an industry standard solvent resistance rub test, such as ASTM D4752 or NCCA11-18, used to determine the degree of cure of a thin (not baked) film by the coating film resistance to a specified solvent. In the rub test used in Table 11, the solvent is methyl ethyl ketone (MEK) and a cheesecloth is cloaked in MEK and stroked across the surface for a specified stroke distance, rate and pressure. In Table 11, a test standard of fifty double rubs were used for the number of strokes. Similarly, the cross hatch test is a standard test method for measuring adhesion by tape test, where a cross hatch patter is made through an applied film to a substrate and pressure sensitive tape is applied over the area of incisions. The tape is then removed rapidly, such as specified in ASTM D 3359. Similarly, the pencil hardness test is a commonly used industry test similar to a scratch test, where harder and harder pencils are used until the coating is scratched, with the softest pencil lead scratching the surface being the hardness. Therefore, the 6H refers to the hardness of the pencil lead and is the maximum pencil hardness used in the test method.

TABLE 11

LV-2 Normal Cure Time Paint Trials

| | Low VOC Stable Binders Binder | Date of Trial | Analysis Number | Page # | SiO$_2$ Wt. % | Gel Time (sec) | Calc. Product VOC % | Trial # 2 50 Rub MEK (24 hrs) | Trial # 2 Pencil Test (24 hrs) | Trial # 2 Cross Hatch (24 hrs) | Trial # 1 50 Rub MEK (48 hrs) | Trial # 1 Pencil Test (48 hrs) | Trial # 1 Cross Hatch (48 hrs) |
|---|---|---|---|---|---|---|---|---|---|---|---|---|---|
| 22 | LV-2 OX | Mar. 6, 2013 | 158150 | B42P31 | 33.2 | 209 | 31.5 | | | | 13 | 6H | 2-3 |
| 13 | LV-2 2 × OX | Apr. 9, 2013 | 158995 | B42P37 | 32.9 | 124 | 37.3 | 50 | 6H | 4 | 50 | 6H | 3 |
| 23 | XHT-28LV-PC | Mar. 20, 2013 | 158452 | B42P35 | 32.2 | 67 | 31.5 | | | | 48 | 6H | 4-5 |
| 14 | LV-2 2 × PC | Apr. 3, 2013 | 158827 | B42P36 | 33.1 | 44 | 37.3 | 50 | 6H | 3 | 50 | 6H | 5 |
| 24 | LV-2 TBA | Mar. 20, 2013 | 158492 | B42P35 | 31.9 | 68 | 31.5 | 50 | 6H | 4 | 50 | 6H | 4-5 |
| 12 | LV-2 2 × TBA | Apr. 12, 2013 | 159064 | B42P38 | 33.0 | 42 | 37.3 | | | | 50 | H | 1-2 |
| 16 | LV-2 PC-OX | Apr. 15, 2013 | 159146 | B42P40 | 31.7 | 59 | 37.3 | 50 | 6H | 4 | 50 | 6H | 3-4 |
| 17 | LV-2 PC-OX | Mar. 22, 2013 | 158495 | B44P29 | 31.9 | 61 | 37.3 | 50 | 6H | 4 | 50 | 6H | 5 |
| 25 | LV-2 OX-TBA | Mar. 22, 2013 | 158494 | B44P29 | 32.0 | 58 | 37.3 | 50 | 6H | 4 | 50 | 6H | 3-4 |
| 15 | LV-2 PC-TBA | Mar. 22, 2013 | 158496 | B44P29 | 32.0 | 60 | 37.3 | | | | 50 | 6H | 1-2 |
| 21 | Control # 1 Standard | Mar. 22, 2013 | 158856 | | 32.8 | 47 | 56.2 | 50 | 6H | 3-4 | 46 | 6H | 5 |
| 21 | Control # 2-1 Standard 2 | Mar. 22, 2013 | 158856 | | 32.8 | 47 | 56.2 | | | | 50 | 6H | 3 |

TABLE 11-continued

LV-2 Normal Cure Time Paint Trials

| | Low VOC Stable Binders Binder | Date of Trial | Analysis Number | Page # | SiO$_2$ Wt. % | Gel Time (sec) | Calc. Product VOC % | Trial # 2 50 Rub MEK (24 hrs) | Trial # 2 Pencil Test (24 hrs) | Trial # 2 Cross Hatch (24 hrs) | Trial # 1 50 Rub MEK (48 hrs) | Trial # 1 Pencil Test (48 hrs) | Trial # 1 Cross Hatch (48 hrs) |
|---|---|---|---|---|---|---|---|---|---|---|---|---|---|
| 21 | Control # 2-2 Standard 2 | Mar. 22, 2013 | 158856 | | 32.8 | 47 | 56.2 | | | | 50 | 6H | 3 |

MEK Rub Test  Pass 50
Cross Hatch    3B-5B
Pencil Test    4H-6H

Certain of the examples were surprisingly found to have a fast cure time, faster than the control sample. As illustrated in Table 12, the fast cure time binders, Examples 15, 16 and 18, which are also found in Tables 7-10, had similar performance, with Example 15 even at six hours showing what required at least twice as long for the control sample in Example 21. Out-performing the control sample.

TABLE 12

Fast Cure Paint Trials LV-2 and Standard 2

| | | | 6 Hour Test Data | | | | | 8 Hour Test Data | | | |
|---|---|---|---|---|---|---|---|---|---|---|---|
| | Solvent Combination | Trial Date | Analysis # | Rub Test | Pencil Test | Cross Hatch | Trial Date | Analysis # | Rub Test | Pencil Test | Cross Hatch |
| 18 | LV-2 PC/MAK | Jan. 17, 2014 | | 5 | 3H | 2B | Jan. 17, 2014 | | 9 | 4H | 4B |
| 16 | LV-2 PC/OX | Jan. 17, 2014 | | 4 | 4H | 2B | Jan. 17, 2014 | | 5 | 6H | 3B |
| 15 | LV-2 PC/TBA | Jan. 17, 2014 | | 50 | 6H | 5B | Jan. 17, 2014 | | 50 | 6H | 5B |
| 21 | Standard 2 | Jan. 17, 2014 | 163267 | 9 | 5H | 4B | Jan. 17, 2014 | 163267 | 11 | 5H | 4B |

| | | | 12 Hour Test Data | | | | | 24 Hour Test Data | | | |
|---|---|---|---|---|---|---|---|---|---|---|---|
| | Solvent Combination | Trial Date | Analysis # | Rub Test | Pencil Test | Cross Hatch | Trial Date | Analysis # | Rub Test | Pencil Test | Cross Hatch |
| 18 | LV-2 PC/MAK | Jan. 17, 2014 | | 33 | 6H | 4B | Jan. 18, 2014 | | 50 | 6H | 5B |
| 16 | LV-2 PC/OX | Jan. 17, 2014 | | 5 | 5H | 3B | Jan. 18, 2014 | | 24 | 6H | 4B |
| 15 | LV-2 PC/TBA | Jan. 17, 2014 | | 50 | 6H | 5B | Jan. 18, 2014 | | 50 | 6H | 5B |
| 21 | Standard 2 | Jan. 17, 2014 | 163267 | 50 | 6H | 4B | Jan. 18, 2014 | 163267 | 50 | 6H | 5B |

MEK Rub Test  Pass 50
Cross Hatch    3B-5B
Pencil Test    4H-6H
Fast Cure less than 12 hours Tables 13-17 also show variations of the LV-3 batches, which are provided as Examples 1-10 plus control sample in Example 11 in Tables 3 and 4. The examples are numbered in Tables 13-17 and are sufficient to show that they meet the desired performance characteristics relative to the control sample. In addition, six tests were performed on different runs of the sample examples to provide a wide range of data. The LV-3 batches with PC/TBA samples 3-5 demonstrate fully cured at 6 hours vs 12 and 24 hour fully cured for the Standard 3 control, sample 11.

TABLE 13

LV-3 Paint Trials Comparison
4 Hour Cure Test Data

| | Solvent Combination | Trial Date | Analysis # | Rub Test | Pencil Test | Cross Hatch |
|---|---|---|---|---|---|---|
| 1 | LV-3 PC/PC | Sept. 2, 2013 | 162054 | 17 | 4B | 2B |
| 1 | LV-3 PC/PC | Sept. 10, 2013 | 162054 | 6 | 6B | 0B |
| 1 | LV-3 PC/PC | Sept. 30, 2013 | 162054 | 3 | 4B | 3B |
| 1 | LV-3 PC/PC | Oct. 1, 2013 | 162054 | 13 | 4B | 3B |
| 1 | LV-3 PC/PC | Oct. 2, 2013 | 162054 | 11 | F | 3B |
| 1 | LV-3 PC/PC | Oct. 17, 2013 | 162054 | 6 | 4B | 4B |
| 2 | LV-3 PC/OX | Sept. 2, 2013 | 162055 | 34 | 6H | 4B |
| 2 | LV-3 PC/OX | Sept. 10, 2013 | 162055 | 6 | 2H | 4B |
| 2 | LV-3 PC/OX | Sept. 30, 2013 | 162055 | 4 | 2H | 3B |
| 2 | LV-3 PC/OX | Oct. 1, 2013 | 162055 | 19 | 5H | 5B |
| 2 | LV-3 PC/OX | Oct. 2, 2013 | 162055 | 50 | 6H | 5B |
| 2 | LV-3 PC/OX | Oct. 17, 2013 | 162055 | 9 | HB | 3B |
| 3 | LV-3 PC/TBA | Sept. 2, 2013 | 162389 | 16 | 5H | 4B |
| 3 | LV-3 PC/TBA | Sept. 10, 2013 | 162389 | 26 | 6H | 4B |
| 3 | LV-3 PC/TBA | Sept. 30, 2013 | 162389 | 12 | 6H | 5B |
| 3 | LV-3 PC/TBA | Oct. 1, 2013 | 162389 | 50 | 6H | 5B |
| 3 | LV-3 PC/TBA | Oct. 2, 2013 | 162389 | 24 | 5H | 5B |

TABLE 13-continued

LV-3 Paint Trials Comparison
4 Hour Cure Test Data

| | Solvent Combination | Trial Date | Analysis # | Rub Test | Pencil Test | Cross Hatch |
|---|---|---|---|---|---|---|
| 3 | LV-3 PC/TBA | Oct. 17, 2013 | 162389 | 50 | 6H | 5B |
| 3 | LV-3 PC/TBA | | | | | |
| 4 | LV-3 2 × PC/TBA | | | | | |
| 5 | LV-3 PC/TBA Inc Acid | | | | | |
| 11 | 3 Standard Control | Sept. 2, 2013 | 160974 | 32 | 6H | 3B |
| 11 | 3 Standard Control | Sept. 10, 2013 | 160974 | 6 | 2H | 2B |
| 11 | 3 Standard Control | Sept. 30, 2013 | 160974 | 3 | 6B | 2B |
| 11 | 3 Standard Control | Oct. 1, 2013 | 160974 | 11 | B | 2B |
| 11 | 3 Standard Control | Oct. 2, 2013 | 160974 | 20 | F | 4B |
| 11 | 3 Standard Control | Oct. 17, 2013 | 160974 | 4 | 3B | 3B |
| 11 | 3 Standard Control | na | na | na | na | na |

TABLE 14

LV-3 Paint Trials Comparison
6 Hour Cure Test Data

| | Solvent Combination | Trial Date | Analysis # | Rub Test | Pencil Test | Cross Hatch |
|---|---|---|---|---|---|---|
| 1 | LV-3 PC/PC | Sept. 2, 2013 | 162054 | 50 | 4H | 3B |
| 1 | LV-3 PC/PC | Sept. 10, 2013 | 162054 | 4 | 4B | 2B |
| 1 | LV-3 PC/PC | Sept. 30, 2013 | 162054 | 7 | 2B | 3B |
| 1 | LV-3 PC/PC | Oct. 1, 2013 | 162054 | 12 | 3H | 4B |
| 1 | LV-3 PC/PC | Oct. 2, 2013 | 162054 | 16 | 6H | 5B |
| 1 | LV-3 PC/PC | Oct. 17, 2013 | 162054 | 9 | 2H | 4B |
| 2 | LV-3 PC/OX | Sept. 2, 2013 | 162055 | 34 | 6H | 5B |
| 2 | LV-3 PC/OX | Sept. 10, 2013 | 162055 | 8 | 5H | 4B |
| 2 | LV-3 PC/OX | Sept. 30, 2013 | 162055 | 5 | 5H | 4B |
| 2 | LV-3 PC/OX | Oct. 1, 2013 | 162055 | 32 | 6H | 4B |
| 2 | LV-3 PC/OX | Oct. 2, 2013 | 162055 | 50 | 6H | 5B |
| 2 | LV-3 PC/OX | Oct. 17, 2013 | 162055 | 12 | H | 5B |
| 3 | LV-3 PC/TBA | Sept. 2, 2013 | 162389 | 37 | 6H | 4B |
| 3 | LV-3 PC/TBA | Sept. 10, 2013 | 162389 | 48 | 6H | 4B |
| 3 | LV-3 PC/TBA | Sept. 30, 2013 | 162389 | 50 | 6H | 5B |
| 3 | LV-3 PC/TBA | Oct. 1, 2013 | 162389 | 50 | 6H | 5B |
| 3 | LV-3 PC/TBA | Oct. 2, 2013 | 162389 | 50 | 6H | 5B |
| 3 | LV-3 PC/TBA | Oct. 17, 2013 | 162389 | 50 | 6H | 5B |
| 3 | LV-3 PC/TBA | Jan. 17, 2014 | 164338 | 50 | 6H | 5B |
| 4 | LV-3 2 × PC/TBA | Jan. 17, 2014 | 1300490 | 27 | 4H | 5B |
| 5 | LV-3 PC/TBA Inc Acid | Jan. 17, 2014 | 1300308 | 50 | 6H | 5B |
| 11 | 3 Standard Control | Sept. 2, 2013 | 160974 | 42 | 6H | 4B |
| 11 | 3 Standard Control | Sept. 10, 2013 | 160974 | 10 | 6H | 5B |
| 11 | 3 Standard Control | Sept. 30, 2013 | 160974 | 5 | 3B | 3B |
| 11 | 3 Standard Control | Oct. 1, 2013 | 160974 | 39 | 5H | 4B |
| 11 | 3 Standard Control | Oct. 2, 2013 | 160974 | 25 | 4H | 5B |
| 11 | 3 Standard Control | Oct. 17, 2013 | 160974 | 7 | HB | 3B |
| 11 | 3 Standard Control | Jan. 17, 2014 | 131902251 | 4 | 2B | 1B |

TABLE 15

LV-3 Paint Trials Comparison
8 Hour Cure Test Data

| | Solvent Combination | Trial Date | Analysis # | Rub Test | Pencil Test | Cross Hatch |
|---|---|---|---|---|---|---|
| 1 | LV-3 PC/PC | Sept. 2, 2013 | 162054 | ND | ND | ND |
| 1 | LV-3 PC/PC | Sept. 10, 2013 | 162054 | 12 | B | 2B |
| 1 | LV-3 PC/PC | Sept. 30, 2013 | 162054 | 4 | B | 4B |
| 1 | LV-3 PC/PC | Oct. 1, 2013 | 162054 | 13 | 2H | 4B |
| 1 | LV-3 PC/PC | Oct. 2, 2013 | 162054 | 32 | 6H | 5B |
| 1 | LV-3 PC/PC | Oct. 17, 2013 | 162054 | 5 | 6H | 4B |
| 2 | LV-3 PC/OX | Sept. 2, 2013 | 162055 | ND | ND | ND |
| 2 | LV-3 PC/OX | Sept. 10, 2013 | 162055 | 26 | 5H | 5B |
| 2 | LV-3 PC/OX | Sept. 30, 2013 | 162055 | 9 | 6H | 4B |
| 2 | LV-3 PC/OX | Oct. 1, 2013 | 162055 | 41 | 6H | 5B |
| 2 | LV-3 PC/OX | Oct. 2, 2013 | 162055 | 50 | 6H | 5B |
| 2 | LV-3 PC/OX | Oct. 17, 2013 | 162055 | 6 | 6H | 5B |
| 3 | LV-3 PC/TBA | Sept. 2, 2013 | 162389 | ND | ND | ND |
| 3 | LV-3 PC/TBA | Sept. 10, 2013 | 162389 | 50 | 6H | 5B |
| 3 | LV-3 PC/TBA | Sept. 30, 2013 | 162389 | 50 | 6H | 5B |
| 3 | LV-3 PC/TBA | Oct. 1, 2013 | 162389 | 50 | 6H | 5B |
| 3 | LV-3 PC/TBA | Oct. 2, 2013 | 162389 | 50 | 6H | 5B |
| 3 | LV-3 PC/TBA | Oct. 17, 2013 | 162389 | 50 | 6H | 5B |
| 3 | LV-3 PC/TBA | Jan. 17, 2014 | 164338 | 50 | 6H | 5B |
| 4 | LV-3 2 × PC/TBA | Jan. 17, 2014 | 1300490 | 50 | 4H | 5B |
| 5 | LV-3 PC/TBA Inc Acid | Jan. 17, 2014 | 1300308 | 50 | 6H | 5B |
| 11 | 3 Standard Control | Sept. 2, 2013 | 160974 | ND | ND | ND |
| 11 | 3 Standard Control | Sept. 10, 2013 | 160974 | 50 | 6H | 5B |
| 11 | 3 Standard Control | Sept. 30, 2013 | 160974 | 5 | HB | 3B |
| 11 | 3 Standard Control | Oct. 1, 2013 | 160974 | 50 | 6H | 4B |
| 11 | 3 Standard Control | Oct. 2, 2013 | 160974 | 12 | 6H | 5B |
| 11 | 3 Standard Control | Oct. 17, 2013 | 160974 | 8 | 5H | 4B |
| 11 | 3 Standard Control | Jan. 17, 2014 | 131902251 | 4 | HB | 2B |

TABLE 16

LV-3 Paint Trials Comparison
12 Hour Cure Test Data

| | Solvent Combination | Trial Date | Analysis # | Rub Test | Pencil Test | Cross Hatch |
|---|---|---|---|---|---|---|
| 1 | LV-3 PC/PC | Sept. 2, 2013 | 162054 | 50 | 6H | 5B |
| 1 | LV-3 PC/PC | Sept. 10, 2013 | 162054 | 7 | 3H | 2B |
| 1 | LV-3 PC/PC | Sept. 30, 2013 | 162054 | 16 | 6H | 4B |
| 1 | LV-3 PC/PC | Oct. 1, 2013 | 162054 | 18 | 3H | 4B |
| 1 | LV-3 PC/PC | Oct. 2, 2013 | 162054 | 40 | 6H | 5B |
| 1 | LV-3 PC/PC | Oct. 17, 2013 | 162054 | 17 | 6H | 4B |
| 2 | LV-3 PC/OX | Sept. 2, 2013 | 162055 | 50 | 6H | 5B |
| 2 | LV-3 PC/OX | Sept. 10, 2013 | 162055 | 19 | 6H | 4B |
| 2 | LV-3 PC/OX | Sept. 30, 2013 | 162055 | 22 | 4H | 4B |
| 2 | LV-3 PC/OX | Oct. 1, 2013 | 162055 | 50 | 6H | 5B |
| 2 | LV-3 PC/OX | Oct. 2, 2013 | 162055 | 50 | 6H | 5B |
| 2 | LV-3 PC/OX | Oct. 17, 2013 | 162055 | 34 | 6H | 5B |
| 3 | LV-3 PC/TBA | Sept. 2, 2013 | 162389 | 50 | 6H | 4B |
| 3 | LV-3 PC/TBA | Sept. 10, 2013 | 162389 | 50 | 6H | 5B |
| 3 | LV-3 PC/TBA | Sept. 30, 2013 | 162389 | 50 | 6H | 5B |
| 3 | LV-3 PC/TBA | Oct. 1, 2013 | 162389 | 50 | 6H | 5B |
| 3 | LV-3 PC/TBA | Oct. 2, 2013 | 162389 | 50 | 6H | 5B |
| 3 | LV-3 PC/TBA | Oct. 17, 2013 | 162389 | 50 | 6H | 5B |
| 3 | LV-3 PC/TBA | Jan. 17, 2014 | 164338 | 50 | 6H | 5B |
| 4 | LV-3 2 × PC/TBA | Jan. 17, 2014 | 1300490 | 50 | 4H | 5B |
| 5 | LV-3 PC/TBA Inc Acid | Jan. 17, 2014 | 1300308 | 50 | 6H | 5B |
| 11 | 3 Standard Control | Sept. 2, 2013 | 160974 | 50 | 5H | 4B |
| 11 | 3 Standard Control | Sept. 10, 2013 | 160974 | 50 | 6H | 5B |
| 11 | 3 Standard Control | Sept. 30, 2013 | 160974 | 27 | 6H | 4B |
| 11 | 3 Standard Control | Oct. 1, 2013 | 160974 | 50 | 6H | 5B |
| 11 | 3 Standard Control | Oct. 2, 2013 | 160974 | 50 | 6H | 5B |
| 11 | 3 Standard Control | Oct. 17, 2013 | 160974 | 22 | 6H | 4B |
| 11 | 3 Standard Control | Jan. 17, 2014 | 131902251 | 23 | 2H | 3B |

TABLE 17

LV-3 Paint Trials Comparison
24 Hour Cure Test Data

| | Solvent Combination | Trial Date | Analysis # | Rub Test | Pencil Test | Cross Hatch |
|---|---|---|---|---|---|---|
| 1 | LV-3 PC/PC | Sept. 2, 2013 | 162054 | 50 | 6H | 5B |

TABLE 17

LV-3 Paint Trials Comparison
24 Hour Cure Test Data

| | Solvent Combination | Trial Date | Analysis # | Rub Test | Pencil Test | Cross Hatch |
|---|---|---|---|---|---|---|
| 1 | LV-3 PC/PC | Sept. 10, 2013 | 162054 | 50 | 6H | 5B |
| 1 | LV-3 PC/PC | Sept. 30, 2013 | 162054 | 50 | 6H | 5B |
| 1 | LV-3 PC/PC | Oct. 1, 2013 | 162054 | 50 | 6H | 5B |
| 1 | LV-3 PC/PC | Oct. 2, 2013 | 162054 | 50 | 6H | 5B |
| 1 | LV-3 PC/PC | Oct. 17, 2013 | 162054 | 50 | 6H | 5B |
| 2 | LV-3 PC/OX | Sept. 2, 2013 | 162055 | 50 | 6H | 5B |
| 2 | LV-3 PC/OX | Sept. 10, 2013 | 162055 | 50 | 6H | 5B |
| 2 | LV-3 PC/OX | Sept. 30, 2013 | 162055 | 50 | 6H | 5B |
| 2 | LV-3 PC/OX | Oct. 1, 2013 | 162055 | 50 | 6H | 5B |
| 2 | LV-3 PC/OX | Oct. 2, 2013 | 162055 | 50 | 6H | 5B |
| 2 | LV-3 PC/OX | Oct. 17, 2013 | 162055 | 50 | 6H | 5B |
| 3 | LV-3 PC/TBA | Sept. 2, 2013 | 162389 | 50 | 6H | 5B |
| 3 | LV-3 PC/TBA | Sept. 10, 2013 | 162389 | 50 | 6H | 5B |
| 3 | LV-3 PC/TBA | Sept. 30, 2013 | 162389 | 50 | 6H | 5B |
| 3 | LV-3 PC/TBA | Oct. 1, 2013 | 162389 | 50 | 6H | 5B |
| 3 | LV-3 PC/TBA | Oct. 2, 2013 | 162389 | 50 | 6H | 5B |
| 3 | LV-3 PC/TBA | Oct. 17, 2013 | 162389 | 50 | 6H | 5B |
| 3 | LV-3 PC/TBA | Jan. 17, 2014 | 164338 | 50 | 6H | 5B |
| 4 | LV-3 2× PC/TBA | Jan. 17, 2014 | 1300490 | 50 | 6H | 5B |
| 5 | LV-3 PC/TBA Inc Acid | Jan. 17, 2014 | 1300308 | 50 | 6H | 5B |
| 11 | 3 Standard Control | Sept. 2, 2013 | 160974 | 50 | 6H | 5B |
| 11 | 3 Standard Control | Sept. 10, 2013 | 160974 | 50 | 6H | 5B |
| 11 | 3 Standard Control | Sept. 30, 2013 | 160974 | 50 | 6H | 5B |
| 11 | 3 Standard Control | Oct. 1, 2013 | 160974 | 50 | 6H | 5B |
| 11 | 3 Standard Control | Oct. 2, 2013 | 160974 | 50 | 6H | 5B |
| 11 | 3 Standard Control | Oct. 17, 2013 | 160974 | 50 | 6H | 5B |
| 11 | 3 Standard Control | Jan. 17, 2014 | 131902251 | 50 | 6H | 4B |

MEK Rub Test Pass 50
Cross Hatch 3B-5B
Pencil Test 4H-6H

Note:
Fast Cure is less than 12 hours
Standard cure is 12 to 24 hours

TABLE 18

| Binder | Polysilicates (g) | Colloidal Silica (g) | Sulfuric Acid (g) | Ethanol (EtOH) (g) | Dipropylene Glycol Methyl Ether (DPM) (g) | Methyl Amyl Ketone (MAK) (g) | Propylene Carbonate (PC) (g) | Parachlorobenzotrifluoride (PCBTF) Oxsol 100 (g) | tert Butyl Acetate (TBA) (g) | Hydrolysis % | SiO$_2$ (wt. %) | Product VOC (wt. %) | Stable Atmospheric (months) |
|---|---|---|---|---|---|---|---|---|---|---|---|---|---|
| LV-4 PC | 1043.1 | 235.4 | 9.4 | 2215.1 | | | 397 | | | 67.6 | 20.92 | 56.8 | na |
| LV-5 PC | 2495.0 | 0 | 3.6 | 1333.7 | | | 200 | | | 86.0 | 24.12 | 52.2 | na |
| LV-5 PC ½Ethanol | 2495.0 | 0 | 3.6 | 666.8 | | | 200 | | | 86 | 28.67 | 43.1 | na |
| LV-3.1 (Theoretical) | 6160.0 | 1400.0 | 24.0 | 5440.0 | | | 1500 | | 1500 | 67.9 | 30.20 | 33.9 | na |

TABLE 19

| Binder | Polysilicates (wt. %) | Colloidal Silica (wt. %) | Sulfuric Acid (wt. %) | Ethanol (EtOH) (wt. %) | lene Glycol Methyl Ether (DPM) (wt. %) | Methyl Amyl Ketone (MAK) (wt. %) | Propylene Carbonate (PC) (wt. %) | Parachlorobenzotrifluoride (PCBTF) Oxsol 100 (wt. %) | tert Butyl Acetate (TBA) (wt. %) | Hydrolysis % | SiO2 (wt. %) | Product VOC (wt. %) | Stable Atmospheric (months) |
|---|---|---|---|---|---|---|---|---|---|---|---|---|---|
| LV-4 PC | 26.75 | 6.04 | 0.24 | 56.80 | | | 10.18 | | 0.00 | 67.6 | 20.92 | 56.8 | na |
| LV-5 PC | 43.00 | 0 | 0.09 | 52.18 | | | 4.76 | | 0.00 | 86 | 24.12 | 52.2 | na |
| LV-5 PC ½Ethanol | 51.09 | | 0.1 | 43.15 | | | 5.66 | | | | 28.67 | 43.1 | na |
| LV-3.1 (Theoretical) | 38.44 | 8.74 | 0.15 | 33.95 | | | 9.36 | | 9.36 | 67.9 | 30.20 | 33.9 | na |

TABLE 20

| Binder | SiO2 (wt. %) | Product VOC (wt. %) | Stable Atmospheric (months) |
|---|---|---|---|
| Silbond HT-28A | 32.97 | 56.2 | 6.0+ |
| Silbond HT-33 | 33.56 | 50.5 | 6.0+ |
| Silbond HT-21.5PM | 20.08 | 74.4 | 6.0+ |
| Silbond H-25 | 25.32 | 54.8 | 6.0+ |
| Silbond HT-30 | 30.2 | 52.7 | 6.0+ |

As described above, the ethylsilicate composition in Tables 18 and 19 are specifically configured for the casting industry, although they could be used in the coatings industry, and the LV3.1 is applicable to both industries. The compositions have been found to provide faster set-up times and create a harder ceramic material in the investment casting process. It should be noted that in all the tables, the column identified as Product VOC, is the amount of regulated VOCs, the total VOCs may be higher. In regards to Table 20, these are existing binders made by Silbond, and the amount of regulated VOCs, amount of silica and stability may be seen for comparison. While the casting binders in Tables 18-19 have higher regulated VOCs than some of the other binders, casting binders have always had higher regulated VOCs, and the new compositions are substantially reduced as compared to the prior art.

The procedure for making the binders generally includes charging ethanol and sulfuric acid, if desired colloidal silica sol, heating the reactor, an ethylsilicate is added to the reactor, which is the hydrolysis reaction, additional heat may be applied to the reactor, if desired ethanol is stripped from the reactor, then the reactor is cooled, charge at least one of the exempt solvents and or a non-exempt to the reactor, mix and then package.

More specifically, Example 16 from Tables 7-10 may be formed as follows. First, charge 800.0 g of ethanol and 7.8 g of sulfuric acid in the reactor and mix for 20 minutes. Then Charge 584.6 g of colloidal silica sol to the reactor (colloidal silica sol is 50% sodium silicate dispersion) and heat reactor to 40 degrees C. Meter in slowly 2093 g of ethylsilicates via a dip tube. This is the hydrolysis reaction, which in this formulation produces 1494.9 g of ethanol. Heat to 78 degrees C. and reflux for sixty minutes. If desired, strip ethanol from the reactor, in this example 1282 g of ethanol stripped which is 55% of total ethanol after the hydrolysis. The reactor is then cooled for thirty minutes after which 360.7 g of PCBT (Oxsol 100) is added to the reactor, along with 154.3 g of PC (Propylene Carbonate). The PCBT and PC are mixed in for 30 minutes and the final product is packaged as desired.

In the above example, 1494.9 g of ethanol is produced during hydrolysis.

More specifically, Example 3 from Tables 3-6 may be formed as follows. First, charge 537.6 g of colloidal silica sol to the reactor (colloidal silica sol is 50% sodium silicate dispersion) and 10.6 g of sulfuric acid in the reactor and immediately charge 179.8 g of PC (Propylene Carbonate) to the reactor. Start full cooling on the reactor. Meter in 917.4 g of ethylsilicates via a dip tube. This is the hydrolysis reaction, which in this formulation produces 1374.7 g of ethanol. Add 1313.5 g of ethylsilicates to the reactor. Add 497.6 g of ethylsilicates to the reactor. Allow contents to mix for one hour and adjust reactor temperature to 30-50 degree C. After one hour, add 389.2 g of TBA (tert butyl acetate) is added to the reactor. Mix for 30 minutes and maintain reactor of 30-40 degree C. The final product is packaged as desired. The added ethylsilicates may vary with different polyethylsilicates, and have different amounts of hydrolysis when added.

In the above example, 1374.7 g of ethanol is produced during hydrolysis.

The procedure for making the LV-5 PC, with half the normal Ethanol is as follows. First, charge 666.8 g of ethanol to reactor, add 3.6 g of sulfuric acid to the reactor, add 2495 g of polysilicates to the reactor, and add 200 g of PC (Propylene Carbonate) to the reactor. Heat reactor to 25-45° C., preferably 30-40° C. Hydrolyze into the reactor mixture 167.7 g of water dropwise using an addition funnel. After the water addition is completed, mix for 60 minutes and maintain reactor of 30-40 degree C. After 60 minutes, allow the binder to cure. The final product is packaged as desired. Take a pint sample to the Analytical Lab for analysis. It should be noted for all the above examples, the temperature and times may vary, such as lowering the temperature may just take longer for the method to complete, and increasing the temperature may speed up the method.

While the invention has been described in connection with its preferred embodiments it should be recognized that changes and modifications may be made therein without departing from the scope of appended claims.

The invention claimed is:

1. A polyethylsilicate composition comprising:
   a polyethylsilicate;
   18-50% by weight SiO$_2$ based on the total composition weight;
   0-60% by weight alcohol based on the total composition weight; and
   a positive amount of solvent, wherein said solvent forms up to 40% by weight, based on the total composition weight, and wherein said solvent comprises at least one of propylene carbonate, 2-amino 2-methyl 1-proponal, parachlorobenzotrifluoride or a combination of propylene carbonate and tert-butylacetate; and
   wherein said solvent and said alcohol in combination comprise 5-70% by weight, based on the total composition weight.

2. The composition of claim 1 wherein the polyethylsilicate composition is hydrolyzed in an amount of 55-90%.

3. The composition of claim 1 wherein ethanol forms the majority of said alcohol.

4. The composition of claim 3 wherein said alcohol is substantially ethanol.

5. The composition of claim 3 wherein said solvent and said ethanol are 10-55% by weight, based on the weight of the total composition.

6. The composition of claim 5 wherein said solvent and said ethanol comprise 16-45% by weight, based on the weight of the total composition.

7. The composition of claim 5 wherein said solvent and said ethanol comprise 35-50% by weight, based on the weight of the total composition.

8. The composition of claim 3 wherein said solvent and said ethanol comprise 10-70% by weight, based on the weight of the total composition.

9. The composition of claim 8 wherein said solvent and said ethanol comprise 30-68% by weight, based on the weight of the total composition.

10. The composition of claim 9 wherein said solvent and said ethanol comprise 40-60% by weight, based on the weight of the total composition.

11. The composition of claim 3 wherein said ethanol is less than 60% by weight, based on the weight of the total composition.

12. The composition of claim 11 wherein said ethanol is less than 45% by weight, based on the weight of the total composition.

13. The composition of claim 12 wherein said ethanol is 10-40% by weight, based on the weight of the total composition.

14. The composition of claim 1 wherein said solvent includes less than 10% by weight of methyl amyl ketone, based on the total weight of the composition, and less than 7.5% by weight of dipropylene glycol methyl ether, based on the total weight of the composition.

15. The composition of claim 14 wherein said solvent includes less than 5% by weight of said methyl amyl ketone and said dipropylene glycol methyl ether in combination, based on the total weight of the composition.

16. The composition of claim 14 wherein said solvent includes less than 3% by weight of said methyl amyl ketone and said dipropylene glycol methyl ether in combination, based on the total weight of the composition.

17. The composition of claim 14 wherein said solvent includes an amount of 1-3% by weight of said methyl amyl ketone and said dipropylene glycol methyl ether, based on the total weight of the composition.

18. The composition of claim 1 wherein said polyethylsilicate composition is essentially free of methyl amyl ketone and dipropylene glycol methyl ether.

19. The composition of claim 1 wherein said solvent includes at least one of 0-25% by weight of said propylene carbonate, 0-25% by weight of said tert-butylacetate, or 0-25% by weight of said parachlorobenzotrifluoride, each individually based upon the total weight of the composition.

20. The composition of claim 19 wherein said solvent includes 5-15% by weight of said propylene carbonate, based on the total weight of the composition.

21. The composition of claim 20 wherein said solvent includes 5-10% by weight of said propylene carbonate based on the total weight of the composition.

22. The composition of claim 19 wherein said solvent includes 5-18% by weight of said tert-butylacetate, based on the total weight of the composition.

23. The composition of claim 16 wherein said solvent includes 8-15% by weight of said tert-butylacetate, based on the total weight of the composition.

24. The composition of claim 13 wherein said solvent includes 5-15% by weight of said parachlorobenzotrifluoride, based on the total weight of the composition.

25. The composition of claim 13 wherein said solvent includes 8-15% by weight of said parachlorobenzotrifluoride based on the total weight of the composition.

26. The composition of claim 1 wherein said solvent comprise 3-40% by weight of the total composition.

27. The composition of claim 1 wherein said solvent comprise 4-30% by weight of the total composition.

28. The composition of claim 1 wherein said solvent comprise 4-24% by weight of the total composition.

29. The composition of claim 1 wherein any individual component of said solvent does not form more than 30% by weight of the total weight of the composition.

30. The composition of claim 1 wherein said solvent includes said propylene carbonate and said tert-butylacetate.

31. The composition of claim 30 wherein said solvent includes 10-25% by weight of the combination of said propylene carbonate and said tert-butylacetate, based on the total weight of the composition.

32. The composition of claim 31 wherein said solvent includes 10-20% by weight of said propylene carbonate and 5-15% by weight of said tert-butylacetate, each based on the total weight of the composition.

33. The composition of claim 31 wherein said solvent includes 3-12% by weight of said propylene carbonate and 7-14% by weight of said tert-butylacetate, each based on the total weight of the composition.

34. The composition of claim 31 wherein said solvent includes 5-6% by weight of said propylene carbonate and 13-14% by weight of said tert-butyl-acetate each based on the weight of the total composition.

35. The composition of claim 34 wherein said alcohol forms 35-40% by weight, based on the total weight of the composition.

36. The composition of claim 1 added to zinc particles and refractories to form a zinc rich coating and wherein the zinc rich coating when applied to a surface is capable of passing a MEK 50 rub test within six to eight hours after application to the surface.

37. The composition of claim 30 wherein said alcohol is 35-40% by weight, said solvents are 18-20% by weight and include 5-6% by weight of said propylene carbonate and 13-14% by weight of said tert-butyl-acetate, each based upon the total weight of the composition.

38. The composition of claim 24 wherein said ethylsilicate is hydrolyzed and wherein said propylene carbonate is added before or during hydrolysis and said tert-butyl-acetate is added after hydrolysis.

39. The composition of claim 1 wherein said $SiO_2$ is a colloidal silica sol.

40. The composition of claim 1 wherein said $SiO_2$ is a condensed silica solution.

41. An polyethylsilicate composition comprising:
  a polyethylsilicate;
  18-80% by weight of $SiO_2$, based on the total weight of the composition;
  an acid;
  an alcohol; and
  propylene carbonate in an amount of up to 30% by weight, based on the total weight of the composition and wherein said alcohol and said propylene carbonate in combination form less than 70% by weight, based on the total weight of the composition.

42. The composition of claim 41 wherein the composition is hydrolyzed in an amount of 55-90%, and wherein said propylene carbonate is added before hydrolization of the composition.

43. The composition of claim 42 further including tert-butylacetate added after hydrolysis.

44. The composition of claim 41 further including parachlorobenzotrifluoride in an amount of up to 25% by weight, based on the total weight of the composition.

45. The composition of claim 44 further including tert-butylacetate in an amount of up to 25% by weight, based on the total weight of the composition.

46. The composition of claim 45 wherein in combination, said tert-butylacetate, said parachlorobenzotrifluoride and said propylene carbonate form 5-40% by weight, based on the total weight of the composition.

* * * * *